United States Patent
Choi et al.

(10) Patent No.: US 6,967,599 B2
(45) Date of Patent: Nov. 22, 2005

(54) METHOD OF REPRODUCING AUDIO SIGNALS WITHOUT CAUSING TONE VARIATION IN FAST OR SLOW PLAYBACK MODE AND REPRODUCING APPARATUS FOR THE SAME

(75) Inventors: Won-Yong Choi, Kyonggi-do (KR); Byoung-Chul Lee, Seoul (KR); Sang-Hun Jeong, Inchon (KR); Won-Sik Choi, Seoul (KR)

(73) Assignee: Cosmotan Inc. (KR)

( * ) Notice: Subject to any disclaimer, the term of this patent is extended or adjusted under 35 U.S.C. 154(b) by 993 days.

(21) Appl. No.: 09/871,293

(22) Filed: May 30, 2001

(65) Prior Publication Data

US 2002/0101368 A1 Aug. 1, 2002

(30) Foreign Application Priority Data

Dec. 19, 2000 (KR) .................................. 10-2000-78170

(51) Int. Cl.[7] .............................................. H03M 7/00
(52) U.S. Cl. ...................................................... 341/61
(58) Field of Search ............................ 341/61, 50, 123, 341/51

(56) References Cited

U.S. PATENT DOCUMENTS 6,373,410 B2 * 4/2002 Ishikura et al. ............... 341/61

6,661,357 B2 * 12/2003 Bland .......................... 341/61

\* cited by examiner

*Primary Examiner*—Brian Young
(74) *Attorney, Agent, or Firm*—Ostrolenk, Faber, Gerb & Soffen, LLP

(57) ABSTRACT

Audio data decoded in an MPEG system to be stored in a storage unit is supplied to an audio output via a filtering processing. For performing the filtering processing, presentation time interval of respective audio data is changed to conform to a user's designated playback speed, and the decoded audio data stored in the storage unit by being synchronized with the changed presentation time interval is written on an input queue in the set unit. A TSM algorithm is performed in the frame unit with respect to the audio data of the input queue to decrease the quantity of the audio data when the designated playback speed is faster than a normal playback speed or to increase it when the designated playback speed is slower than the normal playback speed, in accordance with a value of the designated playback speed. The TSM audio data is transferred to a middle queue. With respect to the audio data of the middle queue, up-sampling or down-sampling is performed in accordance with the value of the designated playback speed. The quantity of the audio data after the sampling becomes substantially the same as that of the decoded audio data, and thus the sampled audio data have a tone substantially identical to that of the normal playback speed and are transmitted to an output queue. The audio data stored in the output queue is synchronized with the changed presentation time interval to be transmitted to the storage in the set unit, and then is reproduced via an audio output.

26 Claims, 17 Drawing Sheets

METHOD OF REPRODUCING AUDIO SIGNALS WITHOUT CAUSING TONE VARIATION IN FAST OR SLOW PLAYBACK MODE AND REPRODUCING APPARATUS FOR THE SAME

TECHNICAL FIELD OF THE INVENTION

The present invention relates to a method of reproducing audio signals or audio/video signals and a reproducing apparatus for the same, and more particularly to a method of processing audio signals capable of reproducing the audio signals without causing noticeable tone variation during the reproducing of the audio signals or the audio/video signals at a high or low speed that is different than the normal playback speed.

BACKGROUND OF THE INVENTION

Video and audio program signals are converted to a digital format, compressed, encoded and multiplexed in accordance with an established algorithm or methodology. The compressed digital system signal, i.e., bitstream, includes a video portion, an audio portion, and an informational portion. Such data is transmitted to a reproducing apparatus via a transmission line or by being stored in a recording medium. A digital reproducing apparatus such as a digital versatile disc (DVD) system, a digital video cassette recorder (VCR) or a computer system incorporated with a multimedia player solution for reproducing multimedia data obtained by multiplexing video data and audio data is provided with a decoding means for reproducing the aforementioned bitstream. This decoding means demultiplexes, de-compresses and decodes the bitstream in accordance with the compression algorithm to supply it as a reproducible signal. The decoded video and audio signals are outputted to a reproducing apparatus such as a screen or a speaker for presentation to the user.

The compressing and encoding of the video and audio signals are performed by a suitable encoder which implements a selected data compression algorithm that conforms to a recognized standard or specification agreed to among the senders and receivers of digital video data. Highly efficient compression standards have been developed by the Moving Pictures Experts Group (MPEG), including MPEG-1 and MPEG-2, which have been continuously improved to suggest MPEG-4. The MPEG standards enable the high speed or low speed reproduction forward or backward in addition to the normal playback mode in the VCR, DVD or similar multimedia recording/reproducing apparatus.

The MPEG standards define a proposed synchronization scheme based on an idealized decoder known as a standard target decoder (STD). Video and audio data units or frames are referred to as access units (AU) in encoded form, and as presentation units (PU) in unencoded or decoded form. In the idealized decoder, video and audio data presentation units are taken from elementary stream buffers and instantly presented at the appropriate presentation time to the user. A presentation time stamp (PTS) indicating the proper presentation time of a presentation unit is transmitted in an MPEG packet header as a part of the system syntax.

The presentation time stamps and the access units are not necessarily transmitted together since they are carried by different layers of the hierarchy. It is therefore necessary for the decoder to associate the presentation time stamp found at the packet layer with the first access unit which follows it.

The situation is further complicated by the fact that in a real decoder the system has little control over the presentation times of the presentation units. For example, in the video decoder, video frames (pictures) must be presented at exact multiples of the frame rate for the video to appear smooth, and the audio frames must be presented at exact multiples of the audio frame rate for the audio to be free of clicks.

In the idealized MPEG synchronization scheme, a system time clock (STC) which maintains a system clock time is provided in the decoder. The initial value of the system clock time is transmitted in the system stream by the encoder as a system clock reference (SCR) in an MPEG-1 bitstream, or as a program clock reference (PCR) in an MPEG-2 bitstream. The decoder sets its local system time clock to the initial value, and then continues to increment it at a clock rate of 90 kHz.

Subsequently, the encoder transmits a presentation time stamp for an audio or video access unit, followed some time later by the AU itself. The decoder compares the PTS to the local system clock time. If they are equal, the AU unit is removed from the elementary stream buffer and is instantly decoded to produce a corresponding PU for the presentation of the same.

However, in the conventional multimedia reproducing apparatuses such as the DVD system, digital VCR or computer system incorporated with a multimedia player solution, when the user selects a fast or slow playback mode, the video data is reproduced in accordance with a designated playback speed while the audio data is subject to be muted due to the difficulty of keeping synchronization with the video data. There are improved reproducing apparatuses which reproduce the audio data altogether during the fast or slow playback mode. In this case, however, the presentation time interval of the audio data sample is outputted by being simply increased or decreased in accordance with the designated playback speed. In more detail, in case of the fast playback mode, the presentation time interval of respective audio data becomes narrower than that during the normal playback to make the tone of the reproduced sound be high because of raising it by octave; contrarily, in case of the slow playback mode, the presentation time interval of respective audio data becomes wider than that during the normal playback to make the tone of the reproduced sound be low because of dropping it by octave to induce so-called tone variation phenomenon.

The above-stated tone variation phenomenon appears identically in the video recording/reproducing system such as the VCR or a cassette tape recorder which is the analog signal processing apparatus. In these systems, if the user varies the playback speed at a high speed or low speed, the speed of reading out the signals from a recording medium by the reproducing apparatus is correlated with the varied speed to be fast or slow. Thus, when the read-out audio signal is outputted unchanged, the audible tone of the reproduced sound is varied as having the high or low sound when compared with that of the reproduced sound at the normal speed.

FIG. 1 shows a functional block diagram related to the decoding of an MPEG reproducing apparatus for reproducing a MPEG file. The MPEG file supplied from a file source is separated into video data and audio data by means of a data separator 12 via a data input 10. Separated video data and audio data are respectively received into a video decoder 14 and an audio decoder 18 to be restored into original data by being decoded in them, which are then respectively supplied to a video output 16 and an audio output 20 to be reproduced as video and sound.

Incidentally, if the user instructs the high speed or low speed reproduction, audio decoder 18 changes the PTS value contained in a header of an audio packet in accordance with the fastness and slowness of the designated playback speed. Thus, the presentation time interval of respective audio sample is compressed or extended as compared with that of the normal playback mode. When the conventional MPEG file is subjected to fast or slow playback mode, the time interval of reproducing respective audio sample is compressed or extended as compared with that of the normal playback to make the tone of the reproduced sound vary to be heard by being modulated as high or low sound.

The tone variation arises because the conventional reproducing system of fast or slow reproduction mode simply extends or compresses the presentation time interval of respective audio signals in the time scale. What's worse, any other signal processing is separately applied for preventing the tone variation. In other words, an additional scheme is further required for preventing the tone variation during the fast or slow reproduction mode.

SUMMARY OF THE INVENTION

In considering the above-enumerated problems of the prior art, an object of the present invention is to provide a reproducing method using a filtering processing of audio data capable of reproducing an audio signal or an audio signal incorporated with a moving picture, in case of varying a playback speed into the fast or slow mode, in a tone substantially identical with that of a normal playback mode, and a reproducing apparatus for the same.

To achieve the above object of the present invention, according to one aspect of the present invention, there is provided a method of reproducing audio data by filtering the audio data in response to the fastness or a slowness of a playback speed designated by a user. In the method of reproducing audio data by filtering, a time scale modulation is performed with respect to the audio data in accordance with a predetermined time scale modulation algorithm to increase or decrease the data quantity of the audio data in response to the fastness or slowness of the designated playback speed. Subsequently, either a down-sampling or up-sampling is performed with respect to the audio data obtained via the time scale modulation in accordance with the fastness or slowness of the designated playback speed to restore the quantity of the audio data after performing the sampling to a level almost the same as the decoded audio data.

By this method, the reproduction is performed after the filtering so as to maintain the tone of a reproduced sound to be substantially identical with that of a normal playback speed although the designated playback speed is slower or faster than the normal playback speed. According to the reproducing method, whenever the change of the playback speed is instructed, the presentation time interval of the audio data is newly calculated to be increased or decreased in accordance with the fastness or slowness of the designated playback speed. Also, the audio data after performing the sampling processing is reproduced by the newly produced presentation time interval.

More specifically, the step of time scale modulation includes the steps of: writing the original audio data stored in buffer means on an input queue in a set unit per predetermined time interval; and performing the time scale modulation algorithm in the frame unit upon the audio data stored in the input queue to decrease the quantity of the audio data in accordance with the designated playback speed when the designated playback speed is faster than the normal playback speed, or to increase the quantity of the audio data in accordance with the designated playback speed when the designated playback speed is slower than the normal playback speed, thereby providing the audio data to a middle queue.

In more detail, the sampling step includes the steps of: with respect to the audio data stored in the middle queue, performing the up-sampling processing when the designated playback speed is faster than the normal playback speed, performing the down-sampling when the playback speed is slower than the normal playback speed, wherein the quantity of the sampled audio data to be transferred to an output queue becomes substantially identical with the quantity of the original audio data; and transferring the sampled audio data stored in the output queue to the buffer means in the set unit per predetermined time interval.

Here, it is preferable that the predetermined time interval is a newly calculated presentation time interval of the sampled audio data which is varied in accordance with the value of the designated playback speed.

More preferably, each of the input queue, middle queue and output queue is operated as a circular queue by controlling a queue pointer thereof.

The sampled audio data of the output queue is overwritten to the buffer unit so as to replace the original audio data existing in the buffer unit, thereby making the actually-reproduced audio data be of the audio data having been subjected to the filtering processing according to the present invention.

If the user instructs the reproduction to be slower than the normal playback speed by as much as $\alpha$ times (where $\alpha>1$), in response to the instruction, the presentation time interval of respective audio data is set to be increased as much as $\alpha$ times when compared with the presentation time interval at the normal playback speed. Thus, there is an effect of lowering the octave of the reproduced sound by as much as roughly $\alpha$ times when compared with that of the normal playback speed. Under this state, the audio data is subjected to the time-scale modulation by using the time-scale modulation algorithm. By doing so, there is an effect that the total presentation time is increased as much as $\alpha$ times since the quantity of the audio data is increased as much as $\alpha$ times while the presentation time interval increased as much as $\alpha$ times is not changed. Successively, once the down-sampling is carried out for decreasing the quantity of the audio data after being subjected to the time scale modulation processing by $1/\alpha$ times, an effect of compressing the audio data in time scale is exerted. Therefore, by reproducing the audio data having been subjected to the down-sampling by the presentation time interval increased by as much as $\alpha$ times, the octave of the reproduced sound is raised by as much as ($\times$ times from the octave lowered by as much as $\alpha$ times, so that the tone of the normal playback speed is restored.

On the contrary, if the user instructs the reproduction to be faster than the normal playback speed as much as $\alpha$ times (where $\alpha>1$), in response to the instruction, the presentation time interval of respective audio data is set to be simply decreased as much as $\alpha$ times when compared with the presentation time interval at the normal playback speed. Thus, there is an effect of raising the octave of the reproduced sound by as much as roughly $\alpha$ times when compared with that of the normal playback speed. Under this state, the audio data is subjected to the time-scale modulation by using the time-scale modulation algorithm. By doing so, there is an effect that the total presentation time is decreased as much as α times since the quantity of the audio data is increased as much as α times while the presentation time interval increased as much as α times is not changed. Successively, once the up-sampling is carried out for increasing the quantity of the audio data after being subjected to the time-scale modulation processing by 1/α times, an effect of extending the audio data in time scale is exerted. Therefore, by reproducing the audio data having been subjected to the up-sampling by the presentation time interval decreased by as much as α times, the octave of the reproduced sound is raised by as much as α times from the octave lowered by as much as α times, so that the tone of the normal playback speed is restored.

In view of one preferred embodiment of the reproducing method according to the present invention, it may be utilized as a method of reproducing decoded audio data in response to a playback speed designated by a user before supplying the audio data stored in storage unit having been decoded in the MPEG system to audio output unit. According to this embodiment of the method, a playback speed control ratio α between the designated playback speed and a normal playback speed is calculated. And, a new presentation time interval of the audio data is also calculated by multiplying a presentation time interval of the audio data in case of the normal playback speed by the playback speed control rate. The audio data stored in the storage unit is written on an input queue in the set unit. A predetermined time scale modulation algorithm is performed in the frame unit with respect to audio data written on the input queue to increase/decrease the quantity of the audio data in proportion to the playback speed control ratio α, and the modulated audio data obtained from the performing of the time scale modulation algorithm is written in a middle queue. Thereafter, with respect to the audio data written in the middle queue, an up-sampling is performed in case of a fast playback mode in which the playback speed control ratio α is smaller than 1 or a down-sampling processing in case of a slow playback mode in which the playback speed control ratio α is larger than 1. A sampling rate is determined to be a reverse number of the playback speed control ratio α so as to allow the quantity of the audio data after performing the sampling processing to be substantially identical with the decoded audio data. The audio data after the sampling is fed to an output queue. Then, the audio data stored in the output queue is loaded to the storage unit in the set unit, and the audio data of the storage unit is reproduced by the calculated presentation time interval. By this method, the tone of a reproduced sound is substantially identical with that of the normal playback speed even when the designated playback speed is faster or slower than the normal playback speed.

Here, the size of the respective audio data transmitted to the output queue after being subjected to the down-sampling or up-sampling is determined by applying an interpolation method with respect to the size of audio data stored in the middle queue in accordance with the value of the playback speed control ratio α so as to substantially identically maintain the characteristics of the audio data before and after the sampling. Also, any algorithm may be applied as the predetermined time scale modulation algorithm once the quantity of the audio data is increased/decreased in accordance with the fastness or slowness of the designated playback speed while almost all characteristics of the audio data before executing the filtering are maintained.

Meantime, there is provided an apparatus for reproducing audio signals in conformity with the above methods of reproducing audio data. According to one embodiment of the present invention, the audio signal reproducing apparatus reproduces the audio data in response to a playback speed designated by a user. Here, the reproducing apparatus includes a playback speed control unit for calculating a playback speed control ratio between the designated playback speed and a normal playback speed, and further calculating a new presentation time interval by multiplying a presentation time interval of the audio data at the normal playback speed by the playback speed control ratio α. The reproducing apparatus includes a storage unit for storing digital audio data in a format to be distinguishable in a packet unit. Also included as a part is a filtering unit which performs a time scale modulation in accordance with a predetermined time scale modulation algorithm with respect to the audio data stored in the storage unit, increases/decreases a quantity of the audio data in response to the designated playback speed, performs down-sampling or up-sampling with respect to the modulated audio data obtained via the time scale modulation in accordance with the designated playback speed, and restores the quantity of the audio data after the sampling to a level substantially identical with that of the decoded audio data. In addition, the reproducing apparatus has an audio output unit which receives audio data having been processed by the audio data filtering unit from the storage unit by a new presentation time interval, and reproduces a sound. By this construction, the tone of a reproduced sound is maintained substantially identical with that of the normal playback speed when the playback speed designated by the user is faster or slower than the normal playback speed regardless of being reproduced by the new presentation time interval.

According to another embodiment of the present invention, an apparatus of reproducing audio signals has an audio signal supplying unit for reading out to provide audio signals from a recording medium in response to a fast or slow mode of a playback speed designated by a user, and a digital signal processing unit which has a background portion and a foreground portion. The background portion performs simultaneously a writing of audio data of the audio signal supplying unit on an input queue in the set unit and a reading of the audio data stored in an output queue in the set unit as the same one period, and converting the audio data read out from the output queue into an analog signal. Also, the foreground portion of the digital signal processing unit performs a predetermined time scale modulation by using a predetermined time scale modulation algorithm in the frame unit with respect to the audio data stored in the input queue to increase or decrease the data quantity in accordance with to a value of the designated playback speed. The foreground portion also performs a down-sampling or up-sampling upon the audio data obtained via the time scale modulation processing in accordance with the value of the designated playback speed to restore the quantity of the audio data after executing the sampling to a level substantially identical with that of the decoded audio data and loads the audio data obtained from the sampling to the output queue. It is preferable that the apparatus further has an analog/digital converting unit for converting an analog audio signal into digital data between the audio signal supplying unit and input queue when the audio signal supplied from the audio signal processing unit is an analog signal.

It also be noted that any algorithm may be applied as the predetermined time-scale modulation algorithm once the quantity of the audio data is increased/decreased in accordance with a value of the designated playback speed while almost all characteristics of the audio data before executing the filtering are maintained. At this time, more preferably, the down-sampling or up-sampling processing is performed by deciding an increase/decrease ratio of data in accordance with the value of the designated playback speed, and increasing/decreasing the quantity of the audio data in accordance with the increase/decrease ratio while substantially identically maintaining the characteristics of audio data before and after the sampling by using an interpolation method.

According to another aspect of the present invention, there is provided a method of reproducing audio data after being subjected to a filtering processing in accordance with a value of a playback speed designated by a user. The method includes the steps of: increasing or decreasing a presentation time of the audio data of a normal playback speed in response to the value of the designated playback speed, and maintaining a presentation time interval of the audio data to have a value of the normal playback speed; performing a time scale modulation processing by using a predetermined time scale modulation algorithm with respect to the audio data to increase or decrease a quantity of the audio data in accordance with the value of the designated playback speed; and reproducing the audio data obtained from the time scale modulation processing during the changed presentation time by the presentation time interval. Thus, a tone of a reproduced sound is substantially identical with that of the normal playback speed even when the designated playback speed is faster or slower than the normal playback speed.

According to this method, the presentation time and the presentation time interval of respective audio data are suitably adjusted to allow the tone of the reproduced sound to be identical with that at the normal playback speed regardless of deleting the up/down-sampling processing. Also, in this case, any algorithm may be applied as the predetermined time-scale modulation algorithm once the quantity of the audio data is increased/decreased in accordance with the fast or slow mode of the designated playback speed while almost all characteristics of the audio data before executing the filtering are maintained.

BRIEF DESCRIPTION OF THE DRAWINGS

The above objects and other advantages of the present invention will become more apparent by describing in detail preferred embodiments thereof with reference to the attached drawings, in which.

DETAILED DESCRIPTION OF THE PREFERRED EMBODIMENTS

To begin with, a method of reproducing audio signals according to one aspect of the present invention and an apparatus for the same will be described.

Figure 1:
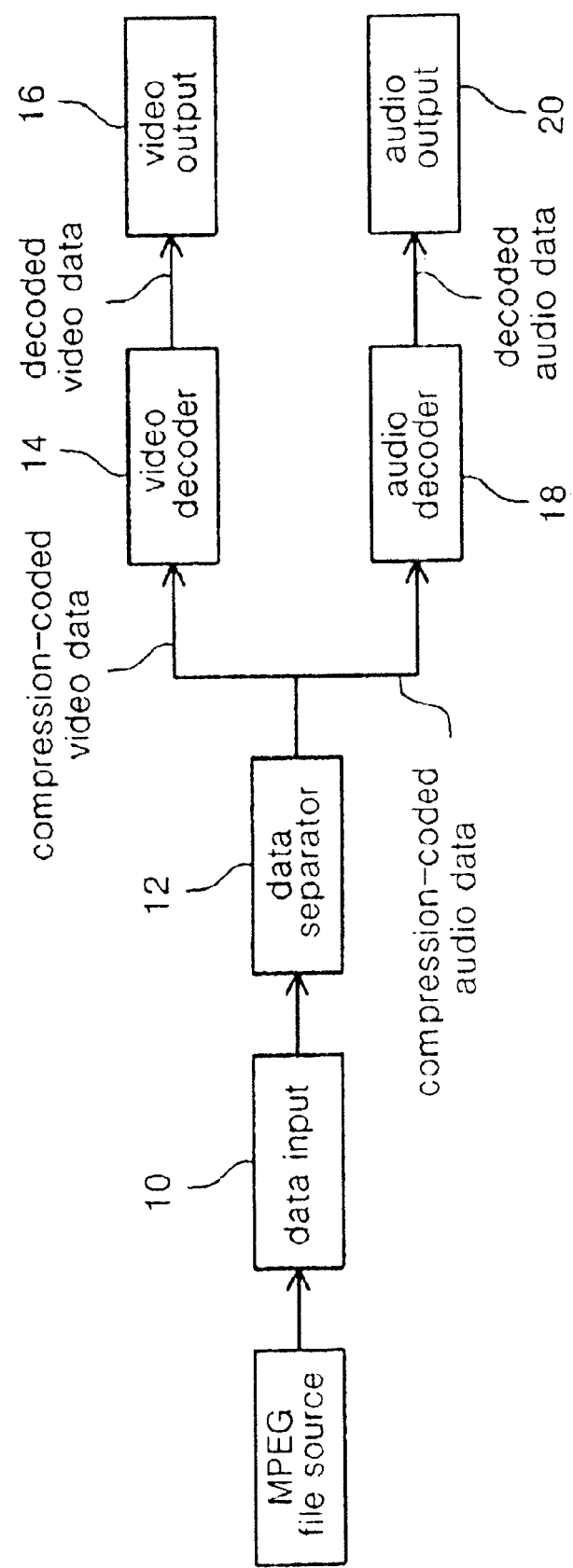
FIG. 1 shows a functional block diagram related to the decoding of a conventional MPEG reproducing apparatus for reproducing a multimedia file.
Figure 2:
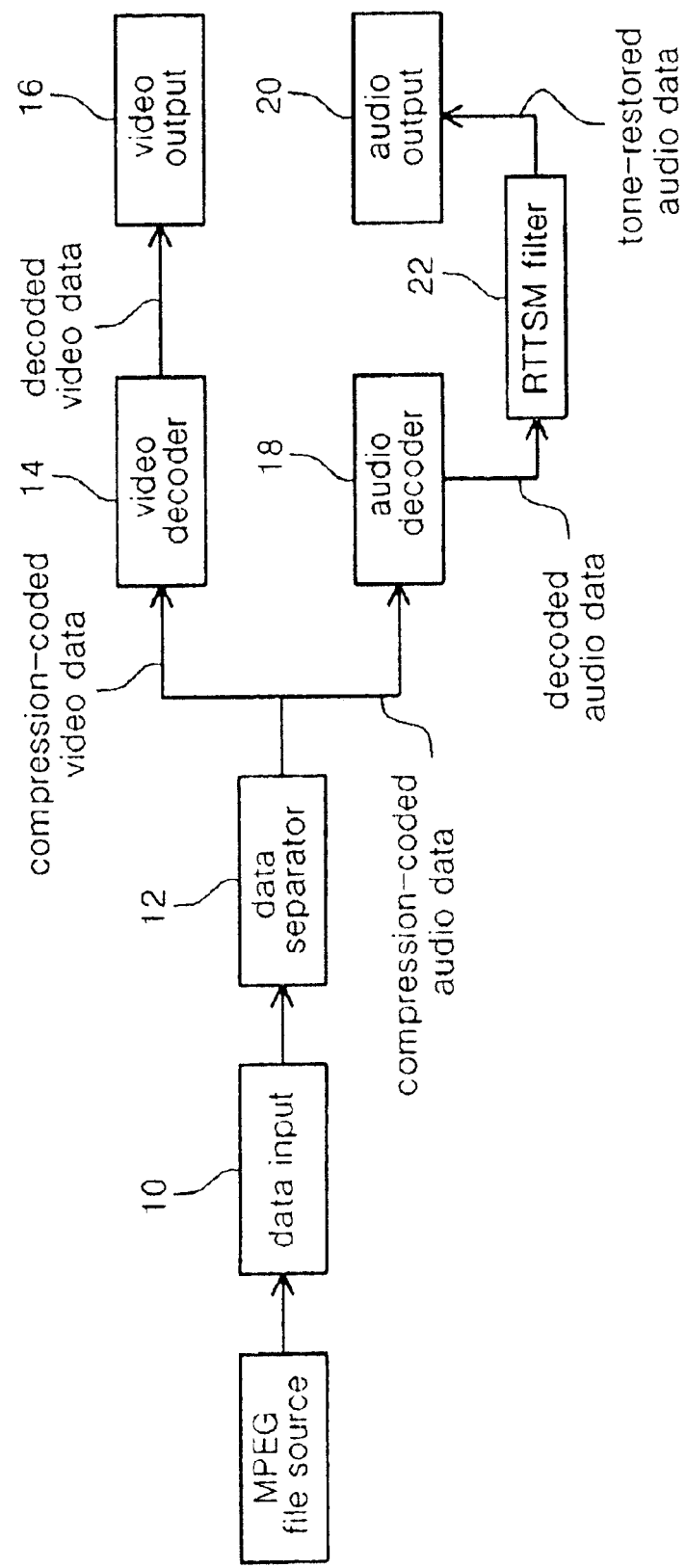
FIG. 2 shows a functional block diagram related to the decoding of an MPEG reproducing apparatus for embodying a method for processing the filtering of audio signals according to the present invention.

FIG. 2 shows a functional bock diagram related to a decoding of an MPEG reproducing apparatus for illustrating a method of processing an audio signal according to the present invention. The MPEG reproducing apparatus differs from the conventional one as shown in FIG. 1 in that audio decoder 18 supplies the original audio packet restored by decompressing and decoding the compressed audio data to an RTTSM filter 22 prior to supplying it to audio output 20 to perform an audio signal filtering process according to the present invention.

The output data obtained from audio decoder 18 after executing the de-compression and decoding is temporarily stored in an output buffer 24 (FIG. 7) in the packet unit. Here, it is supposed that the user designates the playback speed to a low speed reproduction (e.g., slow by two times) or high speed reproduction (e.g., fast by two times). The audio data recorded on output buffer 24 becomes the data (corresponding to FIG. 9(b)) which is modified in time scale to respectively have the modified presentation time interval by responding to the changed playback speed when compared with the data (corresponding to FIG. 9(a)) decoded during the normal playback. For this operation, the MPEG reproducing apparatus carries out a processing for newly setting the presentation time interval by extending or shortening it in response to the fast or slow mode of the playback speed designated by the user. That is, it is necessary to carry out a processing in a manner that a playback speed control ratio α between the playback speed designated by the user and normal playback speed is calculated, and the audio data presentation time interval of the normal playback speed is multiplied by playback speed control ratio α to produce a new audio data presentation time interval. The audio signal reproducing apparatus proposed by the present invention is provided with a means, i.e., a program that newly produces the presentation time interval of respective audio data responding to the fastness or slowness of the designated playback speed whenever the user changes the playback speed via a key input unit (not shown) of the reproducing apparatus. And, the audio data subjected to the filtering process according to the present invention is reproduced in accordance with the calculated presentation time interval. Thus, the program provided to the reproducing apparatus is executed by a control means such as a CPU (not shown). Here, a value of the playback speed control ratio α becomes 1.5 when the low speed reproduction slower than the normal playback speed by 1.5 times is instructed, or becomes 0.5 when the high speed reproduction faster than the normal playback speed by two times is instructed. In other words, the playback speed control ratio α is determined by a reverse relation of a speed ratio between the designated playback speed and normal playback speed.

Respective audio packets (hereinafter referred to as an original signal x(.) which occasionally denotes the audio signal prior to processing the RTTSM filtering) stored in buffer 24 become the input data of an RTTSM filter 22 according to the present invention (refer to FIG. 7).

Figure 3:
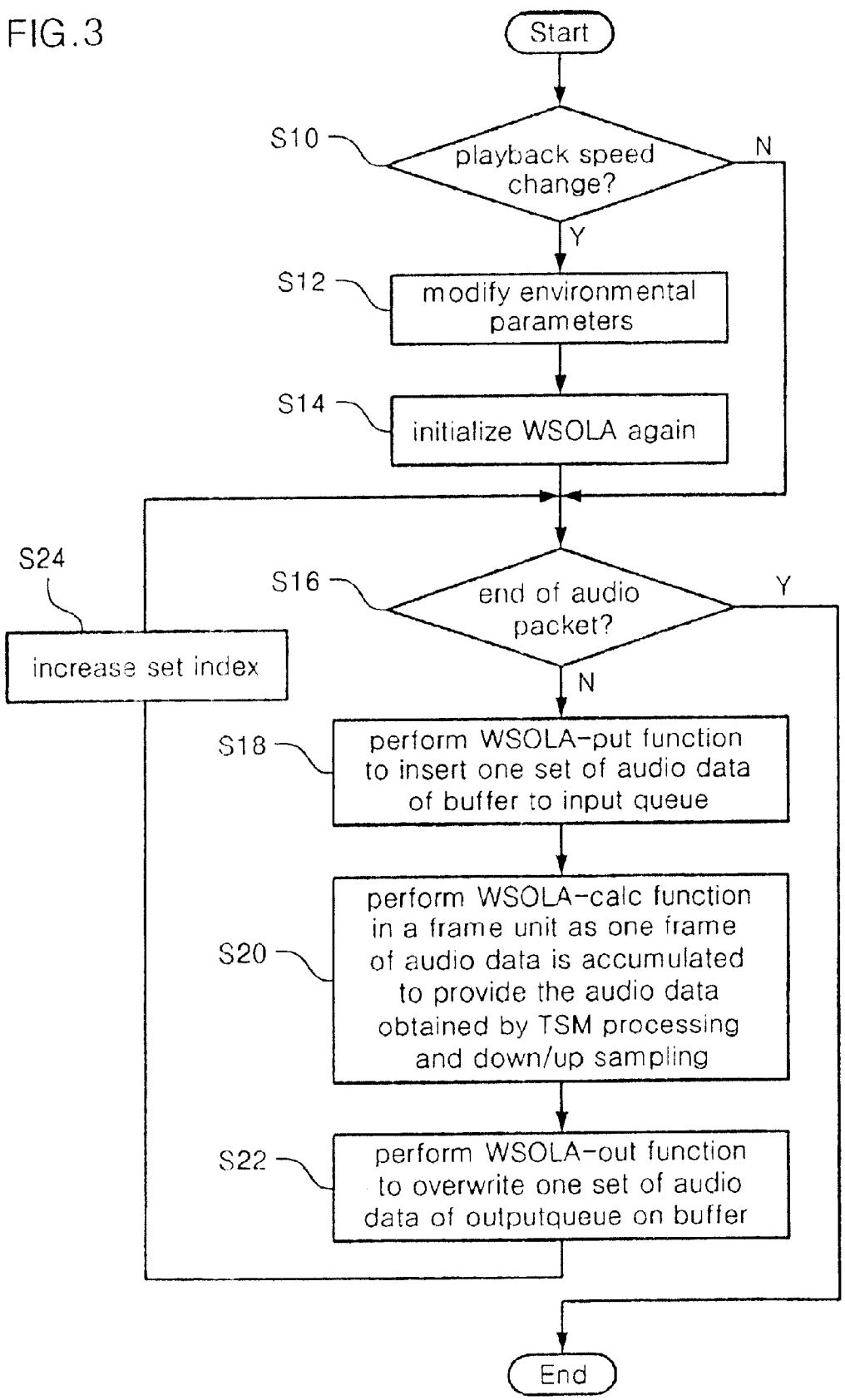
FIG. 3 is a flowchart schematically showing a sequence of the method for performing the filtering of the audio signals executed in a real-time time scale modulation (RTTSM) filter.

The filtering process of the audio data carried out by RTTSM filter 22 is schematically shown in the flowchart of FIG. 3. Functions of RTTSM filter 22 may be embodied in software or hardware. The functions of RTTSM filter 22 will be first described with reference to the flowchart of FIG. 3.

A primary function conducted by RTTSM filter 22 is to increase/decrease the data quantity of the audio data of an input queue Qx provided from output buffer 24 in response to the fast or slow playback speed designated by the user, which is the time scale modification (TSM) of the audio data, and storing it to a middle queue Qy as a TSM signal y(.). The TSM of the audio data may be performed by using one of the known TSM algorithms without any particular modifications or with some modifications for a conformity with a target application.

Several audio signal processing techniques have been suggested for adjusting the playback speed of the audio signal as designated by a user. Particularly, there are some known audio signal processing techniques which are capable of varying the playback speed by increasing or decreasing the data quantity on a time scale basis while maintaining the characteristics similar to those inherent in the original audio signal. Among them, an overlap-addition (OLA) algorithm proposed by Roucus and Wilgus in 1985 may be a representative technique. The OLA algorithm has been developed into the synchronized OLA (SOLA), the waveform similarity based OLA (WSOLA), etc. In addition, the techniques that modify or improve the OLA algorithm such as the global and local search time-scale modification (GLS-TSM), the time-domain pitch-synchronized OLA (TD-PSOLA) and the pointer interval control OLA (PICOLA) have been known.

The description of the present invention hereinbelow utilizes the WSOLA technique as one of the RTTSM algorithms. In accordance with the WSOLA algorithm, the audio data is cut into many blocks by using a window of a predetermined size so that two successive blocks are overlapped by a regular interval, and then the blocks are added after being rearranged by the intervals corresponding to a speed variation to convert the original signal into the data increased or decreased in time scale. So, the WSOLA algorithm can produce the converted signals capable of being reproduced at a speed different from the original playback speed. However, if the signals of mutually different blocks are simply added after changing the time scale intervals, they will be changed to have a sound quality degraded greatly relative to that of the original signal. For allowing the sound quality of the time scaled modified signal to be maximally similar to that of the original signal, when the blocks are rearranged, it is needed that a correlation enabling to determine a waveform similarity between two signals is estimated while providing a minute adjustment interval within a certain range to a required base interval. Then, two block signals are synthesized by moving them as long as a minute adjustment interval corresponding to a value having the greatest waveform similarity. By doing so, it is possible for the sound quality to maintain a level almost similar to that of the original sound regardless of the varying the playback speed. The WSOLA algorithm is based on the above-described concept. That is, the WSQLA algorithm is characterized in that in order to prevent the degradation of the sound quality in the synthesis of the blocks by the rearranging, signals of the two successive blocks are moved by an interval which allows the waveform similarity between two overlapped portions of the two successive blocks to have a maximum value.

Therefore, the present invention adopts the WSOLA algorithm known as having an excellent characteristic of reproducing the original sound among the several TSM algorithms of audio data to be described while using the case of obtaining TSM signal y(.) by increasing or decreasing the length of original audio signal x(.) accumulated on input queue Qx corresponding to the size of playback speed control ratio α designated by the user as an example. However, it should be noted that the present invention is not applied with the WSOLA algorithm solely, and any other algorithms may be applied once it generally increases or decreases the data quantity of the audio data in time scale basis responding to the playback speed in addition with the aforementioned TSM algorithms.

For processing the RTTSM filtering applied with the WSOLA algorithm, first, it is periodically checked whether a user has changed the playback speed (step 510). If there is no instruction of changing the playback speed, the processing is performed in accordance with the already-set playback speed. If there is an instruction of changing the playback speed, the reproducing apparatus produces an event.

Upon the generation of the event, the environmental parameters are newly defined to conform to the designated playback speed (step S12). The environmental parameters are required for performing the WSOLA algorithm, which include a frame size n of original signal x(.), a synchronization lag $K_m$ having an optimum correlation between a previous frame and a current frame, $K_{max}$ which is defined by a check range (window) for detecting the optimum correlation according to the waveform similarity between original signal x(.) and TSM signal y(.), $S_a$ defined as the difference in audio samples between the starting times of successive frames original signal x(.) readout from buffer 24, $S_s$ defined as the difference in audio samples between starting times of successive time scaled frames of TSM signal y(.) obtained after processing the WSOLA algorithm, the number of overlapped samples L between successive frames of the TSM signal y(.), and weights $W_x$ and $W_y$ applied to the samples overlapped between successive frames of the TSM signal y(.). Here, parameters n, $K_{max}$, $S_a$, $W_x$ and $W_y$ are previously defined in the reproducing apparatus, parameter $S_s$ is a value obtained by multiplying the current playback speed by parameter $S_a$, parameter L is a value defined by a relative equation that $L=n-S_s$, and synchronization lag $K_m$ denotes the best alignment point of the starting position of the next frame of original signal x(.) at which it has the optimum correlation with TSM signal y(.).

Besides, three circular queues Qx, Qy and Qz which are the temporary storage means utilized for performing the algorithm, a queue pointer, a sampling rate, a flag for appropriately adjusting the calculating amount in accordance with the performance of the reproducing apparatus, and various set values for defining units necessary for checking the correlation of the waveform are initialized (step S14).

After the algorithm executing environment is established to correspond to the new playback speed designated by the user, RTTSM filter 22 increases or decreases the data quantity responding to the designated playback speed by using the WSOLA algorithm with respect to the decoded audio data previously stored in buffer 24 having been processed by audio decoder 18. Then, the data is again down-sampled or up-sampled to be returned to buffer 24. Hence, the data supplied to audio output 20 is the data which have been processed by the WSQLA algorithm with down-sampling (or up-sampling).

More specifically, the audio data stored in buffer 24 are repeatedly subjected to the processing from step S18 to step S24 in FIG. 3 until reaching the end of each packet, and the identical processing is repeated with respect to the following audio packet.

The RTTSM filtering processing with respect to respective audio packets is attained by performing three functions which are the RTTSM-put function, RTTSM-calc function and RTTSM-out function. The RTTSM-put function reads out audio data (corresponding to FIG. 9(*b*)) by one set from buffer 24 to write it in input queue Qx (step S18). The RTTSM-calc function performs the WSOLA algorithm processing upon the audio data accumulated on input queue Qx in the frame unit to increase or decrease the data quantity in response to the designated playback speed. So, the time-scaled audio data y(.) (corresponding to FIG. 9(*c*)) having the increased or decreased data quantity by responding to the current playback speed is formed to be written on middle queue Qy. The audio data accumulated on middle queue Qy is down-sampled for reducing the data quantity again when the currently-designated playback speed is slower than the normal playback speed or is up-sampled for increasing the data quantity when the currently-designated playback speed is faster than the normal playback speed, and the sampled data is written on output queue Qx (step 520). Also, the RTTSM-out function again supplies the audio data accumulated on output queue Qz to buffer 24 by sets, thereby replacing the existing audio data supplied from audio decoder 18 with the data obtained after performing the RTTSM filtering process (step S22).

Whenever the three functions are sequentially implemented, the index of the audio set is augmented by one, and then it is fedback to step S16 (step S24). Once the index value of the audio set becomes the same as the index of the final sample of the audio packet while repeating this procedure, the data processing procedure described above is repeated with respect to the following audio packet (step S16). The original audio packet previously stored in buffer 24 is changed into a new audio packet in accordance with the above procedure, and the audio packet changed in this manner is output to audio output 20 under the control of the reproducing apparatus, thereby being reproduced as sound via a speaker (not shown) or earphone terminals (not shown).

The audio packet newly obtained by carrying out the RTTSM algorithm is reproduced by audio output 20 to have a tone substantially identical to that of the normal playback, with no dependency on the playback speed designated by the user. The reason of obtaining such result will be described with reference to FIGS. 4 to 10.

Figure 9:
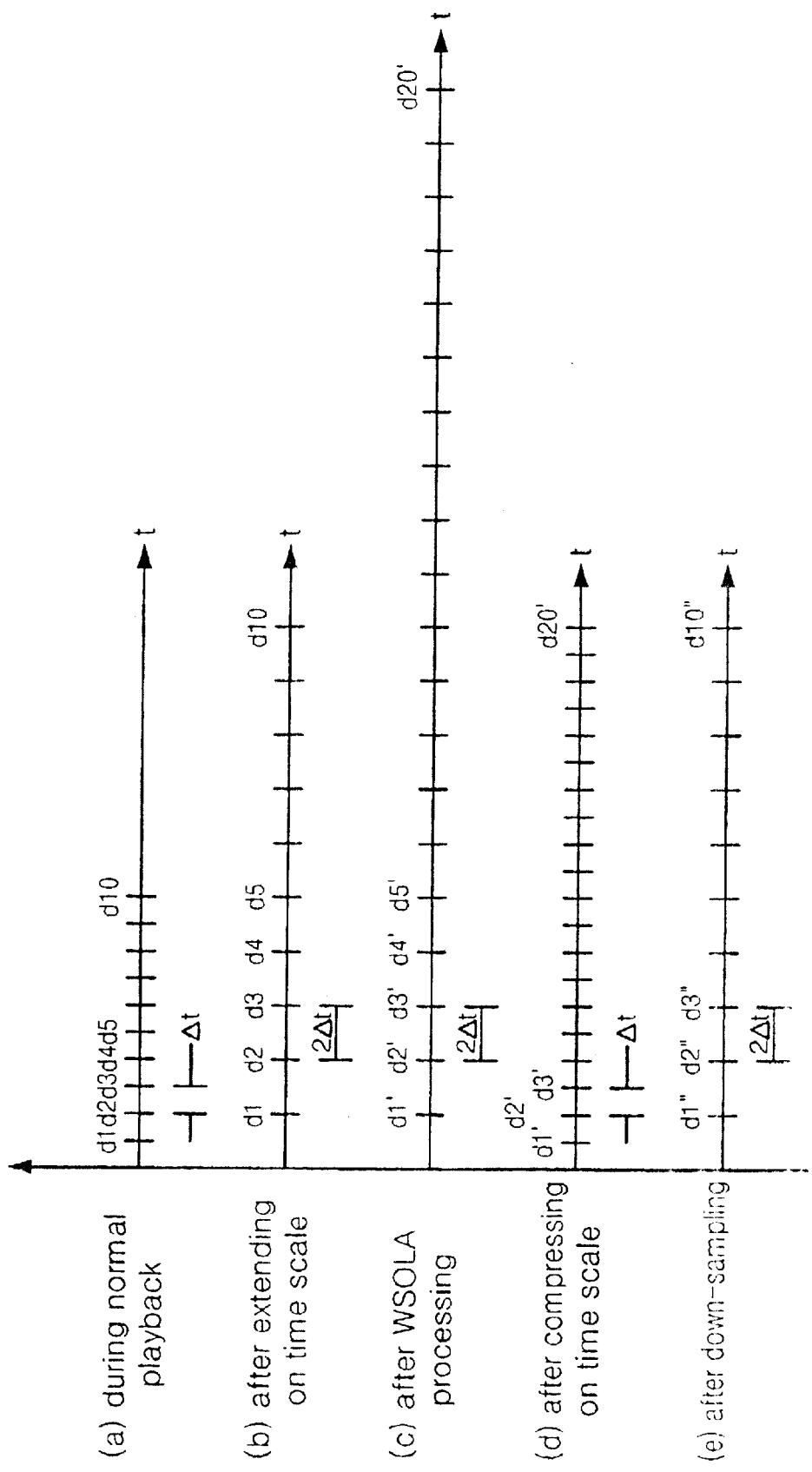
FIG. 9 is views showing, in the event of designating a low speed reproduction which is slower than the normal playback speed by two times, varied states of the presentation time interval of the audio data per data processing step according to the present invention.

FIG. 9 provides views showing, when the designated playback speed is slower than the normal playback speed by two times, changes to the presentation time interval of the audio data per respective data processing steps. FIG. 9(*a*) shows the presentation time interval of the audio data corresponding to the normal playback speed. Assuming that the presentation time interval of respective audio data d1, d2, . . . , d10, . . . is t during the normal playback, audio decoder 18 generates the data which has the presentation time interval of respective audio data d1, d2, . . . , d10, . . . simply increased by two times as shown in FIG. 9(*b*) and stores the generated data in buffer 24. Since the presentation time interval of respective audio data d1, d2, . . . , d10, . . . stored in buffer 24 is 2 t, the reproducing time of the audio data is also expanded by two times. If the presentation time interval of the audio data is increased by two times in time scale, the tone of the reproduced sound is lowered roughly by one octave with the consequence of deteriorating the quality of the reproducing sound although the user's desired playback speed can be satisfied.

The audio data stored in buffer 24 is intended to be presented in the time interval of 2 t as shown in FIG. 9(*b*). In order to reproduce it at the playback speed slower by two times as instructed by the user while maintaining the synchronization with the video data and allowing the tone of the reproduced sound to be identical with the original tone of the normal playback, the WSOLA processing is primarily performed upon the audio data stored in buffer 24. The audio data quantity obtained by performing the WSOLA processing is increased approximately by two times as shown in FIG. 9(*c*). At this time, because the presentation time interval of respective audio data still maintains as much as 2 t, no tone variation occurs.

By the way, in the event of designating the two-fold low speed reproduction by the user, the reproducing apparatus changes the presentation time interval of the audio data from t to 2 t. As a result, the audio data having been subjected to the WSOLA processing has the reproducing time increased by roughly four times, which involves problems that the synchronization with the video data becomes inconsistent and the tone still maintains the tone variation lowered by one octave.

In order to solve these problems, the audio data obtained after performing the WSOLA algorithm is subjected to the down-sampling. For performing the down-sampling, it is conceptually assumed that the presentation time interval of the audio data is compressed in the time scale to be restored to t as shown in FIG. 9(*d*) with respect to the audio data obtained after performing the WSOLA algorithm. Once such a processing is carried out, the total reproducing time becomes that as shown in FIG. 9(*b*). Accordingly, the audio data can be reproduced to conform to the new playback speed set by the user and to be synchronized with the video data. In addition, since there is an effect of recompressing by ½ in time scale, the tone of the audio data is raised by one octave to be restored to be almost identical with the tone as shown in FIG. 9(a).

However, the number of audio data samples still maintains two times as compared with that shown in FIG. 9(b), and the reproducing apparatus is prearranged to present the audio data per 2 t. Due to these facts, only the compression in time scale is insufficient. In other words, for reproducing the audio data in accordance with the presentation time interval of 2 t, it is required for the audio data processed by the WSOLA algorithm as shown in FIG. 9(c) to have the quantity reduced by half. For this purpose, the down-sampling is performed with respect to the audio data processed by the WSOLA algorithm to reduce the quantity of the audio data by half. By performing the down-sampling, the audio data as shown in FIG. 9(e) is finally obtained.

Because the audio data shown in FIG. 9(e) is obtained by down-sampling the audio data (corresponding to FIG. 9(d)) having the tone raised by one octave after compressing the audio data of FIG. 9(c) by half in time scale, the tone thereof is still identical with the tone of the audio data of FIG. 9(d), which is in turn identical with the tone of the audio data of FIG. 9(a). Consequently, while the playback speed is slowed by two times, the tone of the reproduced sound is maintained to be almost the same as that in the normal playback. Of course, the resolution of the audio data is degraded while performing the down-sampling, but the deterioration of the sound quality caused by the degraded resolution is negligible once a sound quality lowering method to be described later is applied during performing the down-sampling.

Figure 10:
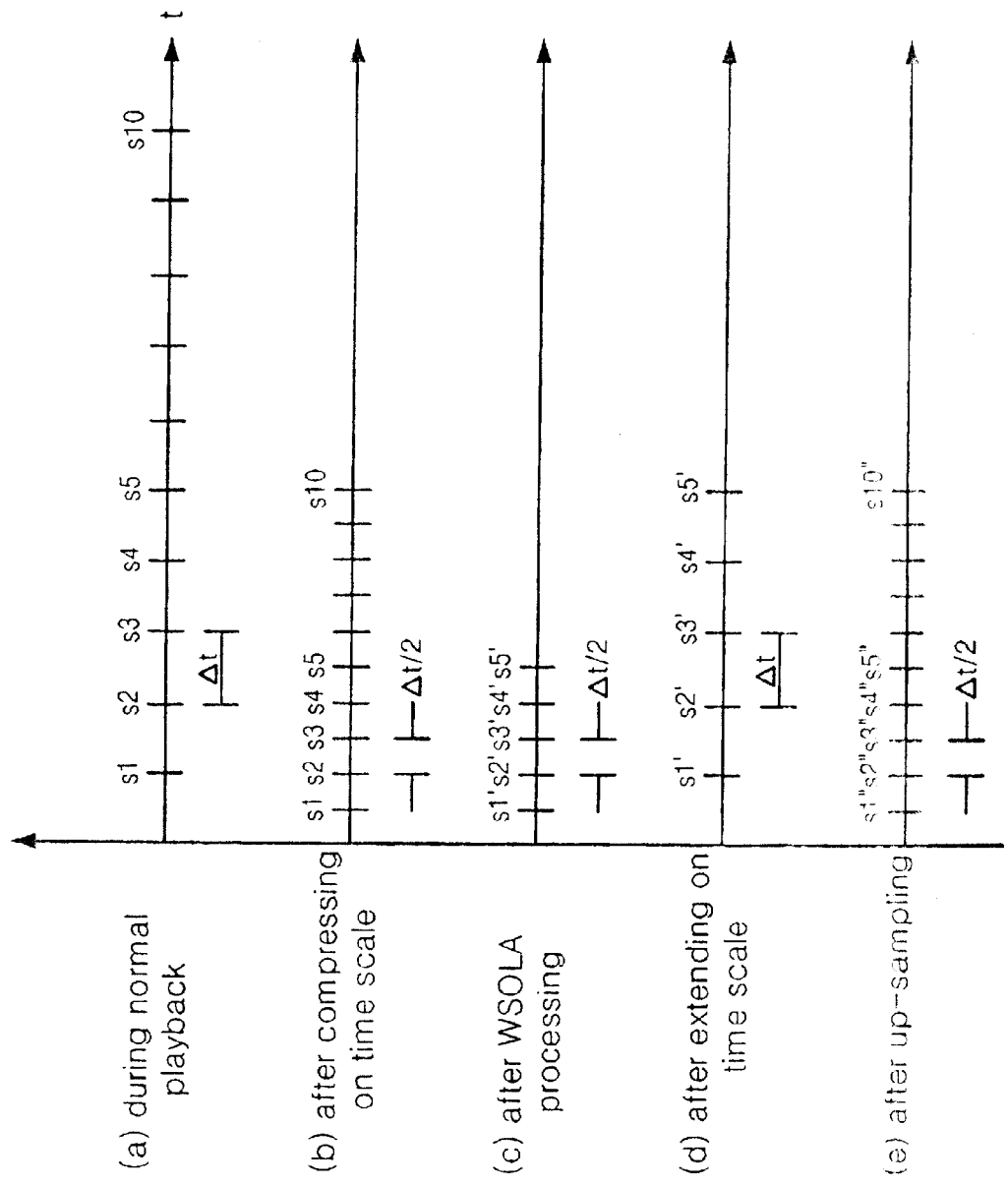
FIG. 10 is views showing, in the event of designating a high speed reproduction which is faster than the normal playback speed by two times, varied states of the presentation time interval of the audio data per data processing step according to the present invention.

FIG. 10 provides views showing, when the designated playback speed is faster than the normal playback speed by two times, changes of the presentation time interval of the audio data per respective data processing steps. FIG. 10(a) shows the presentation time interval of audio data S1, S2, . . . , S10, . . . during performing the normal playback. When the two-fold fast playback is instructed by the user, the reproducing apparatus compresses the sample presentation time interval of respective audio data by ½, i.e., t→t/2, as shown in FIG. 10(b). The audio data stored in buffer 24 is to be reproduced by the time interval of t/2 when being reproduced as it is. Accordingly, the tone of the reproduced sound is to be raised by one octave as compared with that of the normal playback. Therefore, the audio data is processed in such a manner that the WSOLA processing and up-sampling are executed with respect to the data stored in buffer 24 to not only quicken the playback speed by two fold but also maintain the tone of the normal playback in the reproduced sound.

Firstly, the data stored in buffer 24 is subjected to the WSOLA processing to decrease the quantity of the audio data by substantially ½ as shown in FIG. 9(c). At this time, since the presentation time interval of respective audio data continuously maintains t/2 unchanged, the tone also maintains the state of being raised by one octave as compared with that of the normal playback. The reproducing time of the audio data after performing the WSOLA processing is shortened by as much as ¼ as compared with that of the normal playback causing the problem of inconsistent synchronization with the video data as well as the problem of maintaining the tone variation higher by one octave.

To solve these problems, the up-sampling is performed with respect to the audio data obtained after performing the WSOLA processing. For performing the up-sampling, it is conceptually assumed that the presentation time interval of the audio data is expanded in time basis by two times to be restored to t as shown in FIG. 10(d) with respect to the audio data obtained from the WSOLA processing. Once such a processing is carried out, the total reproducing time becomes that as shown in FIG. 10(b). Accordingly, the audio data can be reproduced to conform to the new playback speed set by the user, with being synchronized with the video data. Additionally, since there is an effect of expanding again by ½ in time scale, the tone is raised by one octave to be restored to be substantially identical with that as shown in FIG. 10(a).

However, the number of audio data samples is still only one-half that shown in FIG. 10(b), and the reproducing apparatus is prearranged to present the audio data per t/2. Due to these facts, only the compression in time scale is insufficient. In other words, for reproducing the audio data in accordance with the presentation time interval of t/2, it is required for the audio data obtained by performing the WSOLA processing shown in FIG. 10(c) to have the quantity increased by two times. For this purpose, the up-sampling is preformed with respect to the audio data obtained from the WSQLA processing, so that its data quantity is increased by two times. By performing the up-sampling, the audio data as shown in FIG. 10(e) is finally obtained.

Because the audio data S1", S2", . . . , S10" . . . shown in FIG. 10(e) is obtained by up-sampling upon the audio data (corresponding to FIG. 10(d)) having the tone lowered by one octave after expanding the audio data of FIG. 10(c) by two times in time scale, the tone thereof is still identical with the tone of the audio data of FIG. 10(d), which is in turn identical with the tone of the audio data of FIG. 10(a). Consequently, while the playback speed is quickened by two times, the tone of the reproduced sound is maintained to be almost the same as that of the normal playback.

The above-described down-sampling or up-sampling after executing the WSOLA algorithm is performed by three functions which will be described later. Also, the down-sampling or up-sampling is performed in a manner that the increase or decrease rate of the data is determined in accordance with the fastness or slowness of the playback speed designated by the user, and the quantity of the audio data is increased or decreased in accordance with the determined increase/decrease rate. Amplitudes of the respective audio data after the sampling may take those of the TSM audio data obtained from the WSOLA processing unchanged or may be determined by interpolating the amplitudes of the adjacent audio data. Herein below, a specific data processing algorithm by using respective functions will be described.

Figure 4:
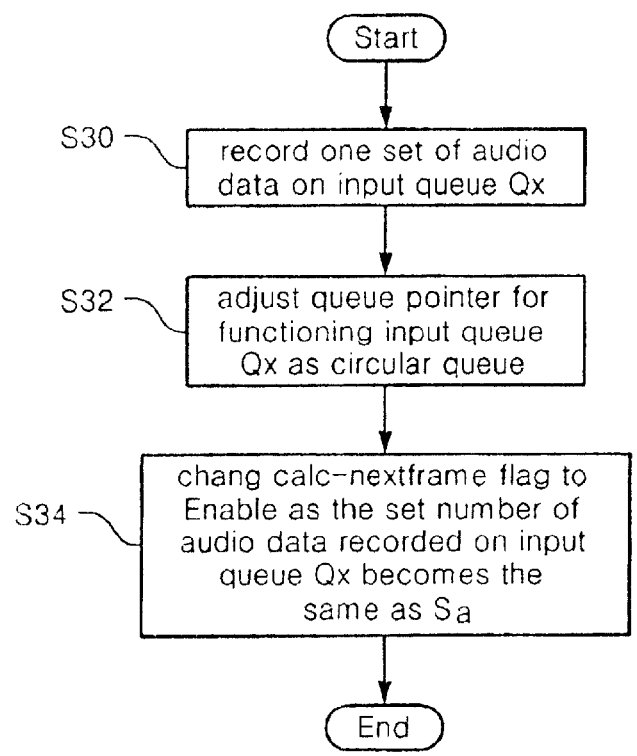
FIGS. 4, 5 and 6 are flowcharts respectively showing the routines of the RTTSM-put function, RTTSM-out function and RTTSM-calc function.
Figure 5:
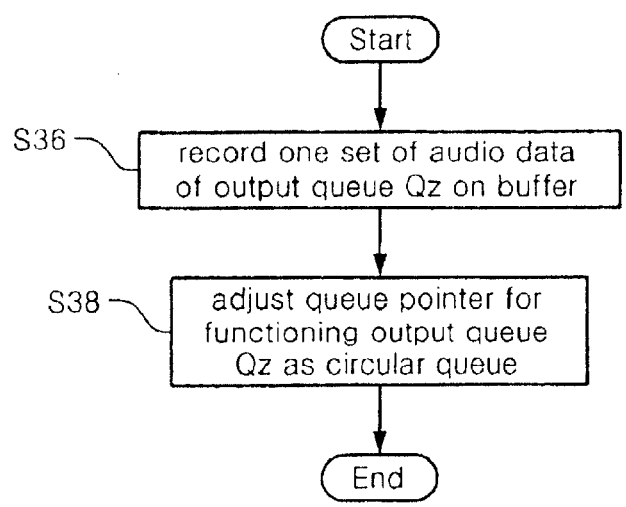
Figure 6:
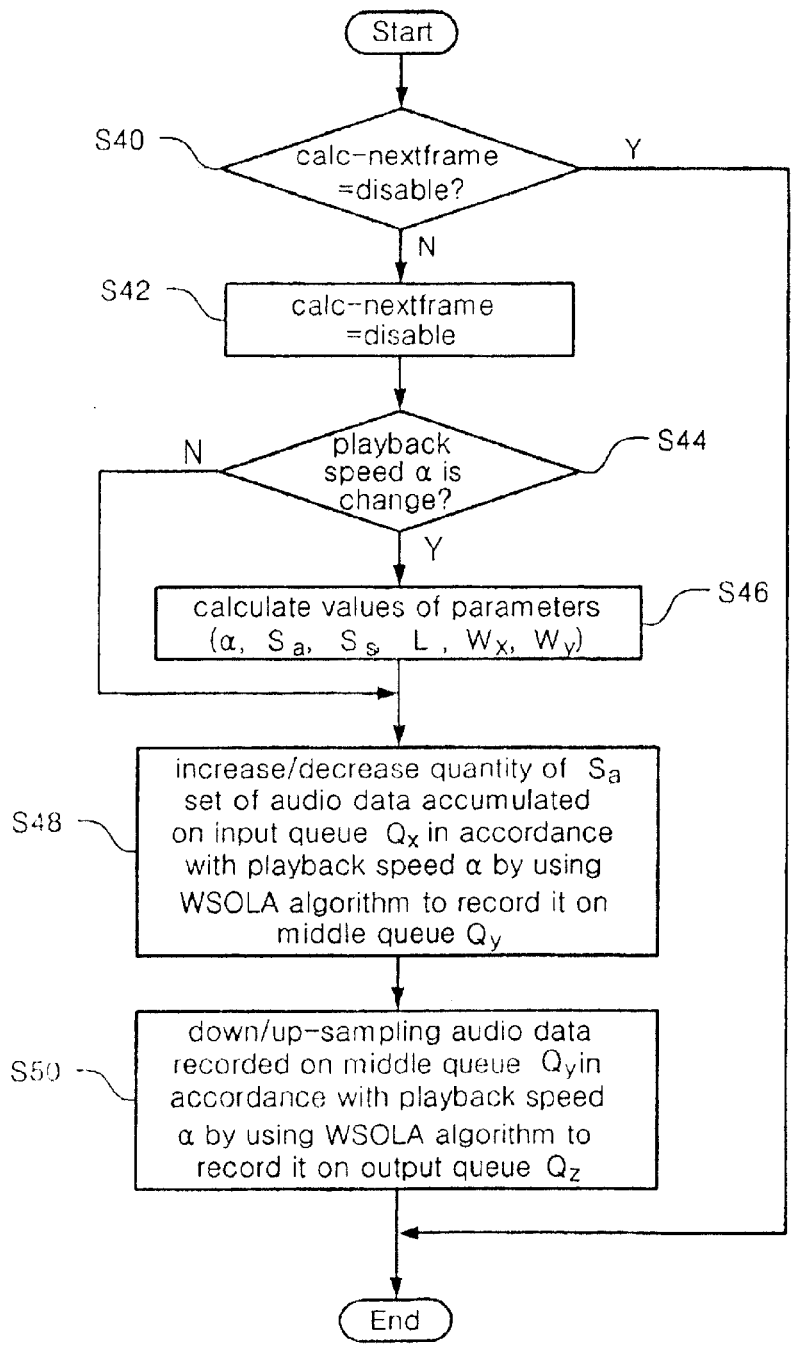
Figure 7:
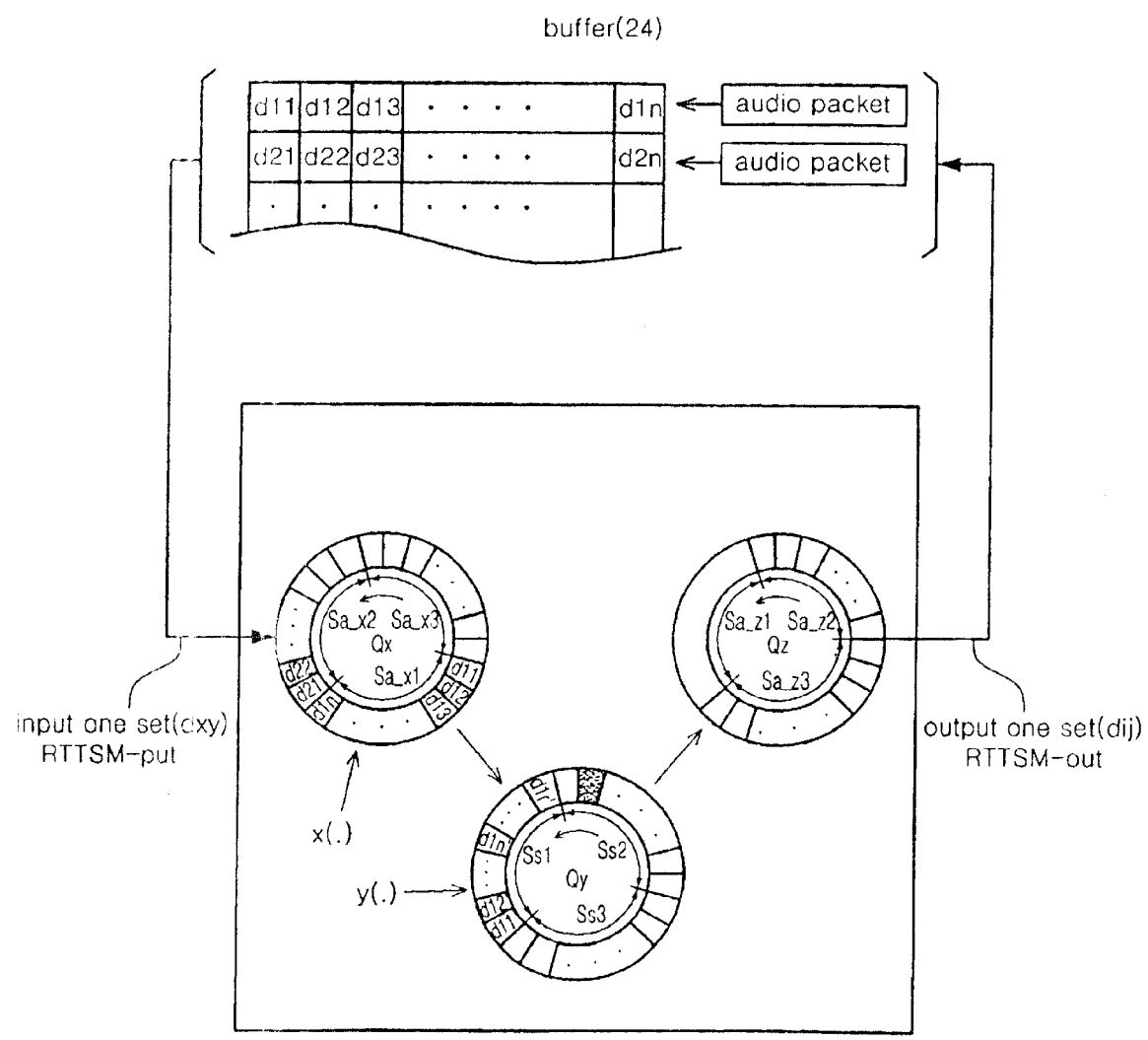
FIG. 7 is a view for illustrating a process of transforming respective audio packets of the buffer into new audio packets by being subjected to the filtering processing via an input queue Qx, a middle queue Qy and an output queue Qz by executing the RTTSM-put function, RTTSM-out function and RTTSM-calc function.
Figure 8:
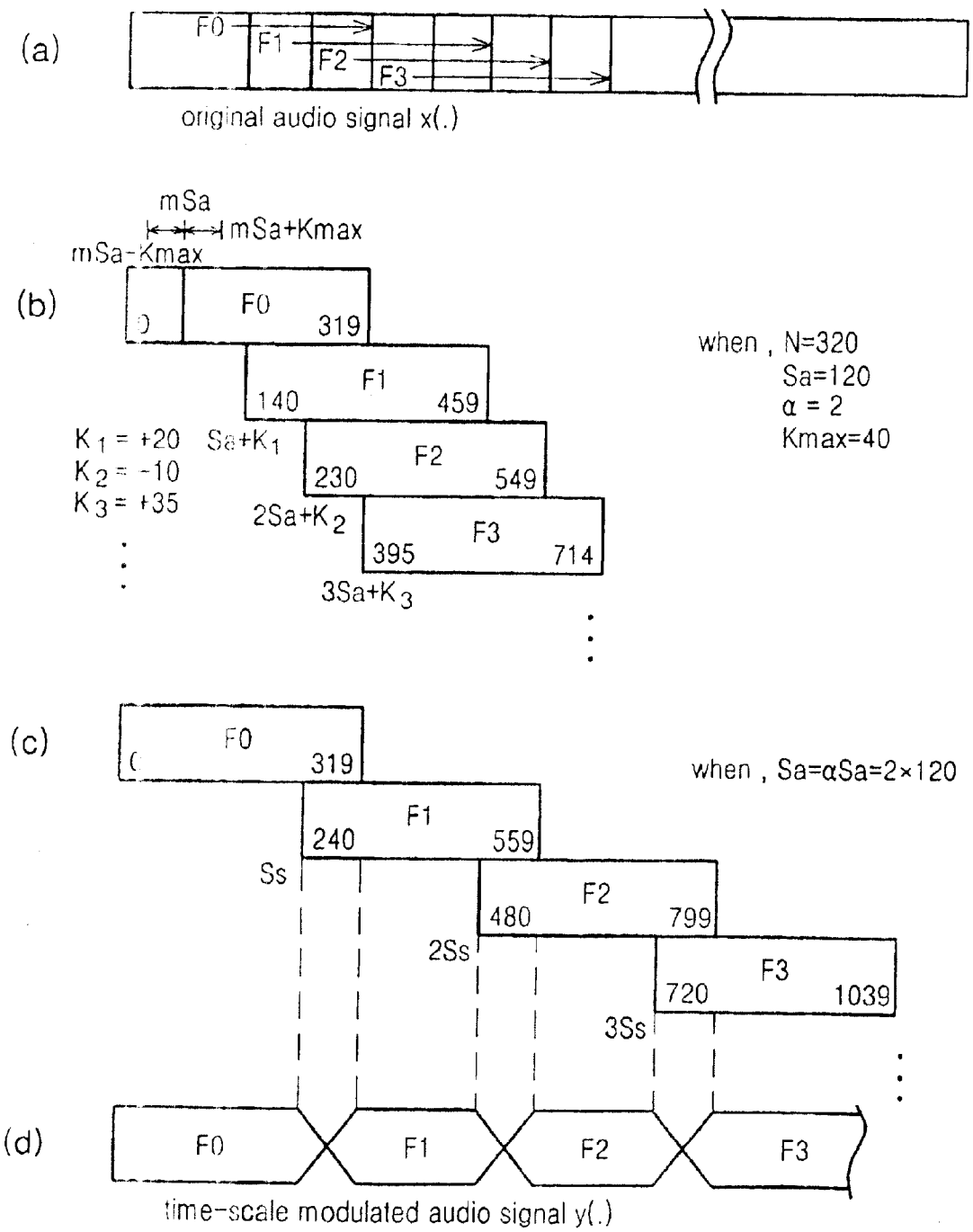
FIG. 8 is views for illustrating a principle of obtaining a time scale modification signal y(.) such that the time scale modification algorithm is executed with respect to an original audio signal x(.) to increase or decrease the data quantity in response to the playback speed set by a user.

FIGS. 4, 5 and 6 are flowcharts respectively showing the routines of the RTTSM-put function, RTTSM-out function and RTTSM-calc function, and FIG. 7 is a view illustrating a process of transforming respective audio packets of buffer 24 into new audio packets via input queue Qx, middle queue Qy and output queue Qz by implementing the three functions. FIG. 8 provides views illustrating a principle of obtaining a TSM signal y(x) such that the length of original audio signal x(x), i.e., the quantity of the audio data, is expanded or compressed in time scale in response to the fastness or slowness of the playback speed set by the user. In the present invention, three queues are utilized for performing the WSOLA processing and the up/down-sampling using the three functions.

When the user designates a playback speed which may be faster or slower than the normal playback speed, the reproducing apparatus changes the presentation time intervals of respective sets of the audio data to fit with the designated playback speed. Therefore, respective sets of the audio packets stored in buffer 24 are intended to be reproduced by the presentation time intervals as shown in FIG. 9(b) or FIG. 10(b). Every audio packet of buffer 24 is sequentially read out by one set $d_{xy}$, as the set index of the audio data is increased by one and is written on input queue Qx (step S30) by implementing the RTTSM-put function as shown in FIG. 4. Here, the set has two kinds of formation. It can be preferably formed with one audio data for a mono system, but it also can be formed with two audio data for left/right channels for a stereo system. Needless to say, under the premise that the order of the audio data is maintained unchanged, one set may consist of a plurality of audio data.

Input queue Qx is preferably required to have a size long enough for accumulating the audio data of more than roughly 3 frames. As one set is written, a pointer value of input queue Qx is increased. After the queue pointer indicates the last position of input queue Qx during the process of increasing the queue pointer, it is reset to indicate the starting position to allow input queue Qx to serve as a circular queue. In addition, as one set is written on input queue Qx, it is counted. Then, as the counted number of sets becomes the same as the set value of parameter $S_a$, a calc-nextframe flag for deciding whether the next frame is calculated or not is changed to Enable. Of course, the default value of the calc-nextframe flag is set as Disable, and the change of the value to Enable denotes that input queue Qx is stored with at least one frame capable of performing the WSOLA algorithm.

Together with writing the audio data before performing the filtering according to the present invention on input queue Qx by reading out from buffer 24 by one sets, RTTSM-out function as shown in FIG. 5 is carried out to read out the audio data stored on output queue Qx having been subjected to the WSOLA processing and up/down-sampling processing by one sets $d_{ij}$ and then overwrite it on buffer 24 in the same rate of the input case as the set index is increased by one (step S36). Because the data quantity after performing the WSOLA processing and down/up-sampling processing is the same as that prior to performing the processings, no problem occurs except for the postponing of the overall reproducing time for a short time period (i.e., time required for performing the WSOLA processing and down/up-sampling processing) even though the data is read out in sets from output queue Qz to be sequentially written on buffer 24. Output queue Qz is set to have a size capable of being simultaneously stored with the data of at least two frames, and the queue pointer is adjusted for serving as the circular queue (step S38).

During transmitting the audio data accumulated on input queue Qx to output queue Qx, the RTTSM-calc function as shown in FIG. 6 is executed to perform the TSM processing based on the WSOLA algorithm and down/up-sampling processing. It should be noted that, while the execution period of RTTSM-put function and RTTSM-out function is of the set unit, the execution period of the RTTSM-calc is processed in the frame unit which is a group of a plurality of sets. That is, the RTTSM-calc function is implemented only when the value of calc-nextframe flag is in the Enable state (step S40). Also, whenever the foregoing processing upon the current frame is carried out, the value of calc-nextframe flag is shifted to Disable to prepare the processing of the next frame (step S42).

It is checked whether there is the instruction of changing the playback speed during processing the current frame by the RTTSM-out function or not. Thus, the values of the environment parameters, i.e., playback speed, $S_a$, $S_s$, L, $W_x$ and $W_y$, required for processing the WSOLA algorithm are modified again when there is the instruction of changing the playback speed (steps S44 and S46). During processing the WSOLA algorithm, the reproducing system controls to generate an event to make the RTTSM-calc function process the audio data of $S_a$ unit at each time. At this time, because it is necessary to process one $S_a$ in accordance with the same playback speed value, the routine of modifying the environmental parameters resulting from the change of the playback speed is inherently included into the routine of the RTTSM-calc function. Thus, when the playback speed is changed, the environmental parameter values according to the changed playback speed are applied from processing the following Sa.

When there is no change in the playback speed, the WSOLA processing is performed with the preset values of environmental parameters as follows. By executing the RTTSM-put function, the input queue Qx is accumulated with the audio data. Here, the RTTSM processing with respect to the audio data stored in input queue Qx is performed every time the calc-nextframe flag is set to Enable. In order to perform the WSOLA processing, it is required for input queue Qx to be stored with audio data of at least one frame.

Exemplary explanations will be described below for assisting the understanding of the WSOLA processing. It is supposed that frame $F_m$ is formed by 320 samples, playback speed control ratio α is 2, the basic difference value $S_a$ of the starting points between successive frames of original signal x(.) on input queue Qx is 120 (samples), and the check range (window) $K_{max}$ for detecting the optimum correlation of the waveform similarity between original signal x(.) and TSM signal y(.) is ±40 (samples). Playback speed control ratio α represents the variation of the data quantity during the WSOLA processing. For instance, if the designated playback speed is slower than the normal playback speed by two times, the reproducing apparatus sets playback speed control ratio α to 2, so that the quantity of the audio data after the WSOLA processing is increased by roughly 2 times as compared with that before the processing. Due to the increase of the data quantity by two times, the reproducing time is increased by two times to make the playback speed slower by two times. Contrarily, when a high speed playback faster by two times than the normal playback is designated as the playback speed, the reproducing apparatus sets playback speed control ratio α to 0.5. Thus, the quantity of the audio data after the WSOLA processing is decreased by approximately ½ as compared with that prior to the processing. The reproducing time is also shortened as much as the decreased data quantity. Also, it is supposed that the audio data is made for the mono system in which one sample constitutes one set. Following descriptions are also available to the stereo system because there is no difference from the mono system in view of the basic data processing system excepting that any particular consideration should be taken about the fact that one set consists of two samples in case of the stereo system. While these values are only given as examples, these are changeable into different values in accordance with the environment applied.

To begin with, initial frame F0 of original signal x(.) is read out from input queue Qx to be duplicated on middle queue Qy as TSM signal y(.), and the value of frame index m is set to one. Thereafter, from the next frame, the following loop is executed until the whole original audio signal x(.) are completely modified.

Next frame F1 of original signal x(.) is read out from input queue Qx to be added as TSM signal y(.) to middle queue Qy. Here, when reading out next frame F1 from original signal x(.), a reading-start position may be variably determined. The reading-start position is determined by a synchronization lag $K_1$ with the prior out frame F0 which was previously duplicated to middle queue Qy as TSM signal y(.). Also, the position of adding read-out next frame F1 as TSM signal y(.) to middle queue Qy is variably determined in accordance with the magnitude of playback speed control ratio $\alpha$.

Synchronization lag $K_m$ is used for finding a point at which next frame $F_m$ of original signal x(.) has the optimum correlation with previous frame $F_{m-1}$ already recorded on middle queue Qy as TSM signal y(.) within a predetermined range.

Following correlation equations are used for determining synchronization lag $K_m$. The synchronization lag $K_m$ is computed by sliding $F_m$ around $y(m^*S_s)$ within a range between the minimum value $mS_a-40$ and maximum value $mS_a+40$.

$$c(m, K) = \sum_{j=0}^{L-1} y(m\ S_s + j) \cdot X(mS_a + K + j), S_s = \alpha S_a \quad (1)$$

$$c(m, K_m) = \max [c(m, K)], -K_{max} \leq K \leq K_{max}, \quad (2)$$

where L is the number of overlapped samples of successive frames.

Here, in computing the optimum correlation between successive frames, a computing method with sliding the audio data one by one is available. However, this computing method imposes a burden of performing a lot of calculations on the reproducing system. Therefore, a method of skipping a plurality of audio data may be recommendable as the computing method of the optimum correlation when it is required to speed up the calculating speed. However, it is inevitable that the method would be inferior to the former method in view of an accuracy of the optimum correlation. It is preferable to consider a performance of a CPU of the reproducing apparatus in deciding which method would be more suitable.

Once synchronization lag $K_m$ having the optimum correlation is obtained by using the above two equations, next frame $F_m$ including N number of samples is read out from original signal x(.) by using the obtained synchronization lag $K_m$. The reading-start position of next frame $F_m$ is a position which is determined by jumping from the reading-start position of previous frame $F_{m-1}$ by $S_a \pm K_m$ number of samples, where $0 < S_a \pm K_m < N$. For example, referring to FIG. 8, if $K_1$, $K_2$ and $K_3$ are respectively decided as 20, −10 and 35, the reading-start positions of second, third and fourth frames F1, F2 and F3 are $140^{th}$, $230^{th}$ and $395^{th}$ samples. Of course, the number of samples of respective frames are constantly 320 which is N. According to the reading method of original signal x(.) from input queue Qx described above, considerable amount of samples of the previous frame and next frame are overlapped. Also, according to the magnitude of playback speed control ratio $\alpha$ the overlap portion in TSM signal y(.) may be large (when $\alpha>1$) or small (when $\alpha<1$). It should be noted that the reading-start positions of respective frames are not regularly changed by the multiplication of $S_a$ with frame index m, but irregularly changed in accordance with the magnitude of optimum correlation $K_m$ decided by using the equations (1) and (2).

After reading out as described above, next frame $F_m$ is added to TSM signal y(.) in middle queue Qy. The starting positions of next frame $F_m$ to be added to TSM signal y(.) are determined by $m\alpha S_a$. Therefore, as $\alpha S_a = 2 \times 120 = 240$ in FIG. 8, the starting positions for the addition to second, third and fourth frames F1, F2 and F3 become 240, 480 and 720, respectively. In the addition, there are overlap portions between the head portion of next frame $F_m$ and the rear portion of previous frame $F_{m-1}$. The overlap portions of the successive frames are added by being weighted with a weighted value by using the following equations (3) and (4) while the remaining portion of next frame $F_m$ is simply copied.

$$y(mS_s+j)=(1-g(j))y(mS_s+j)+g(j)(mS_a+K_m+j), \text{ where } 0 \leq j \leq L \quad (3)$$

$$y(mS_s+j)=(mS_a+K_m+j), \text{ where } L \leq j \leq N \quad (4)$$

Here, g(j) is a weighted value function, of which a representative form is preferably a linear function. Alternatively, an exponent function may also be applied as the weighted value function.

In the manner as described above, original signal x(.), which has the presentation time interval as shown in FIG. 9(b) or 10(b), stored in buffer 24 is read out from input queue Qx in the frame unit and then is added to TSM signal y(.) of middle queue Qy. By this processing, middle queue Qy is accumulated with audio data having been subjected to the WSOLA processing in response to the designated playback speed. For instance, if the designated playback speed is slower by two times than the normal playback speed, the audio data as shown in FIG. 9(c) is stored in middle queue Qy. If it is faster by two times than the normal playback speed, the audio data as shown in FIG. 10(c) is stored in middle queue Qy. It is preferable for middle queue Qy to secure a size capable of storing the audio data of at least two frames.

The audio data accumulated in middle queue Qy via the WSOLA processing is then transferred to output queue Qz. During the transferring, the down-sampling or up-sampling is performed in accordance with the playback speed. In performing the sampling, a data increase/decrease rate is determined based on the playback speed designated by the user, and then the audio data quantity is varied in accordance with the determined increase/decrease rate by using an interpolation method capable of not causing any changes in data characteristics before and after the sampling. The interpolation method is a numerical analysis method for inferring a new point from other given points. There are some typical interpolation methods: the interpolation method using the Taylor polynomial which is commonly employed in numerical interpretation, the interpolation method using the Lagrange polynomial, the repetitive interpolation method, the Hermite interpolation method and the three-dimensional Spine interpolation method, and a linear interpolation method which is the simplest one. Any interpolation method may be applied to the present invention only if it allows the characteristics of the audio data to be almost identical to each other before and after the sampling.

Hereinafter, it is supposed that the interpolation is performed by the linear interpolation method which uses an equation passing all points of the audio data given and the weighted values.

Figure 11:
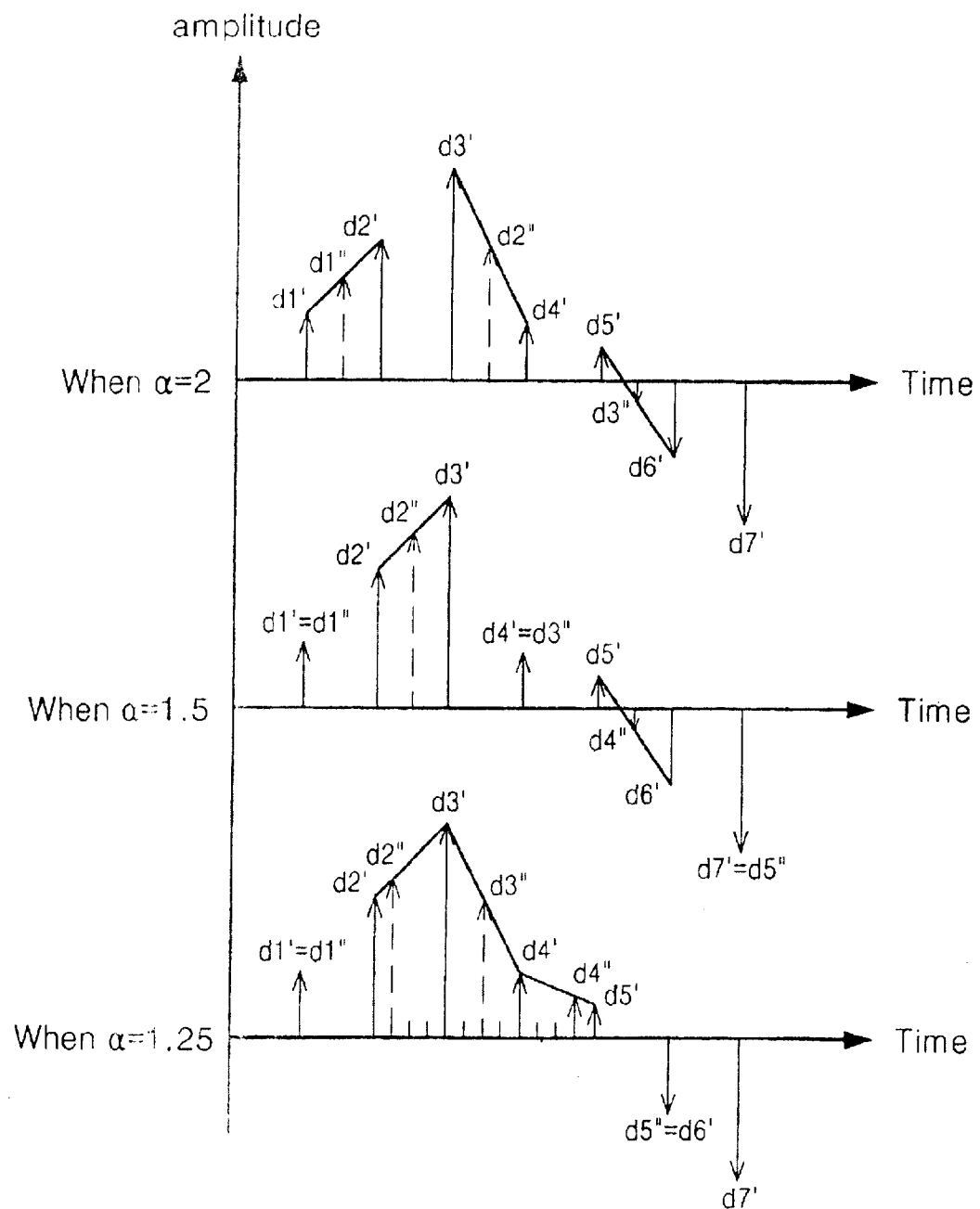
FIG. 11 is views for illustrating a method for processing the down-sampling according to the present invention.

When the user designates the playback speed slower than the normal playback speed, the down-sampling processing should be performed since the data quantity has been increased by the WSOLA processing. This will be described with reference to FIG. 11.

As a first exemplary case as shown in FIG. 11(a), when the designated playback speed is slower than the normal playback speed by two times, i.e., when playback speed control ratio α is set to 2, the quantity of audio data d1', d2', d3' . . . stored in middle queue Qy after being subjected to the WSOLA processing should be reduced by half prior to being transferred to output queue Qz. In order to reduce the quantity of audio data, two successive audio data, or audio samples, should be reduced to one audio data. At this time, the magnitude of one newly-formed audio data, i.e., amplitude, is obtained by a value of averaging the amplitudes of two successive audio data. That is, the amplitude values of the audio data d1", d2", d3", . . . after performing the down-sampling have the relation as below:

$$d1"=(d1'+d2')/2$$

$$d2"=(d3'+d4')/2$$

$$d3"=(d5'+d6')/2$$

FIG. 11(b) shows a second exemplary case that the designated playback speed is slower than the normal playback speed by 1.5 times, i.e., playback speed control ratio α is set to 1.5. The quantity of audio data d1', d2', d3', . . . stored in middle queue Qy after being subjected to the WSOLA processing should be reduced by ⅔ times prior to being transferred to output queue Qz. In this case, the down-sampling is performed in a manner that, since three audio data is to be regarded as one unit for being reduced to two audio data, the first audio data takes unchanged per three audio data, and the average of the second and third audio data is calculated to decrease them as one audio data. That is, the amplitude values of audio data d1", d2", d3", d4", . . . obtained from the down-sampling have the following relation:

$$d1"=d1'$$

$$d2"=(d2'+d3')/2$$

$$d3"=d4'$$

$$d4"=(d5'+d6')/2$$

As a third exemplary case as shown in FIG. 11(c), if the designated playback speed is slower than the normal playback speed by 1.25 times, i.e., playback speed control ratio α is set to 1.25, the quantity of audio data d1', d2', d3', . . . stored in middle queue Qy after being subjected to the WSOLA processing is reduced by ⅘ times. The down-sampling is performed in a manner that five audio data is regarded as one unit to be reduced to four. That is, the amplitude values of audio data d1", d2", d3", d4", d5" . . . obtained from the down-sampling, which should be transferred to the output queue Qz, have the following relation:

$$d1"=d1'$$

$$d2"=d2'+(d3'-d2')/4$$

$$d3"=d3'+2(d4'-d3')/4$$

$$d4"=d4'+3(d5'-d4')/4$$

$$d5"=d6'$$

It is worthwhile to generalize the above method to be modified and applied to the case where the playback speed control ratio α has any other values.

Figure 12:
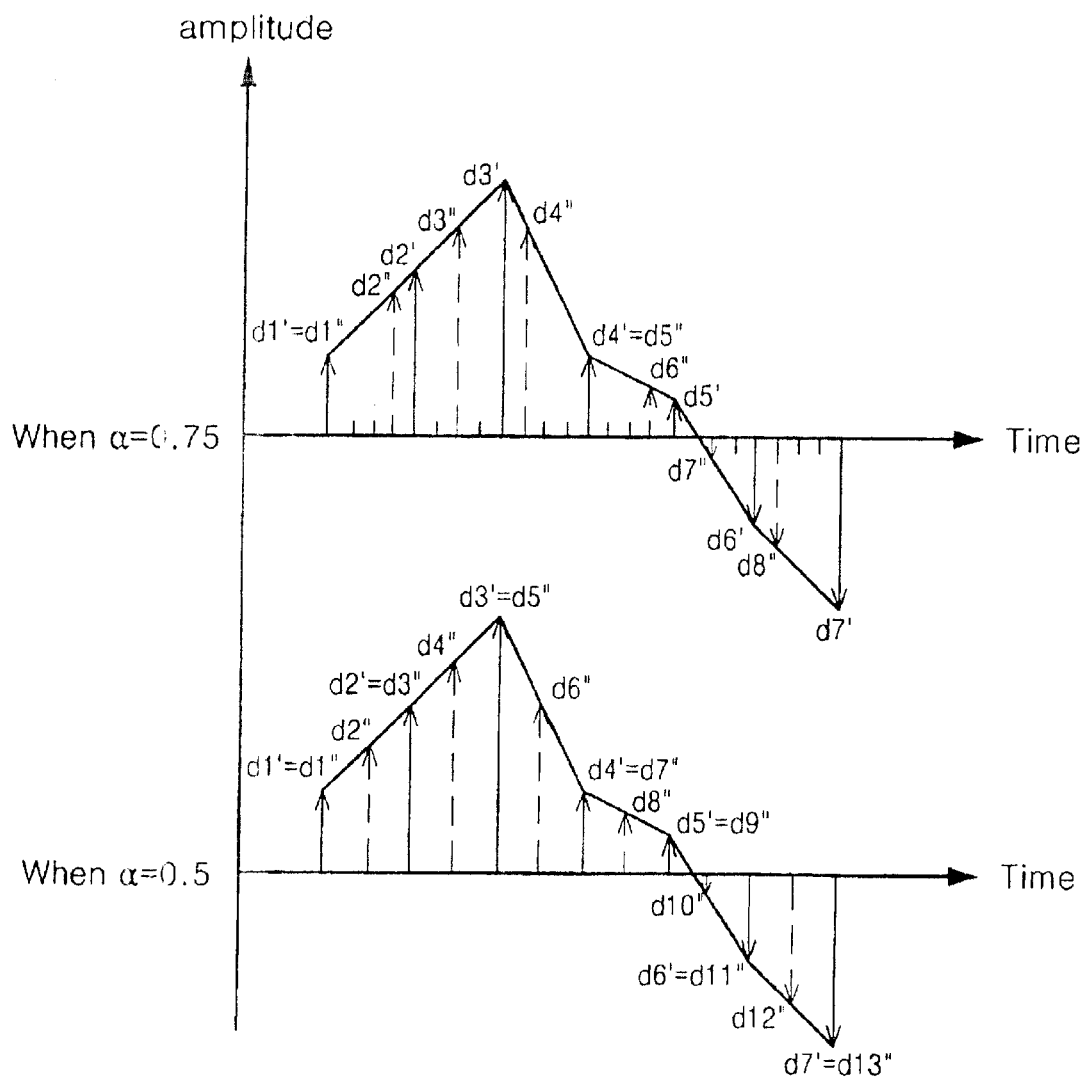
FIG. 12 is views for illustrating a method for processing the up-sampling according to the present invention.

On the other hand, when the user designates a fast playback mode, the up-sampling should be performed with respect to the audio data stored in middle queue Qy and newly formed audio data by the up-sampling is transferred to output queue Qz since the audio data is decreased by the WSOLA processing in this case. Detailed descriptions for this will be given with reference to FIG. 12.

As a first exemplary case as shown in FIG. 12(a), when the designated playback speed is faster than the normal playback speed by 4/3 times, playback speed control ratio α is set to 0.75. In this case, the quantity of audio data d1', d2', d3', . . . stored in middle queue Qy should be increased by 4/3 times by the up-sampling prior to being transferred to the output queue Qz. That is, the amplitude values of audio data d1", d2", d3", d4", d5", d6" . . . obtained from the up-sampling of the audio data d1', d2', d3', . . . by 4/3 times have the following relation:

$$d1"=d1'$$

$$d2"=d1'+3(d2'-d1')/4$$

$$d3"=d2'+2(d3'-d2')/4$$

$$d4"=d3'+(d4'-d3')/4$$

$$d5"=d4'$$

$$d6"=d4'+3(d5'-d4')/4$$

FIG. 12(b) shows a second exemplary case that the designated playback speed is faster than the normal playback speed by two times, that is, playback speed control ratio α is set to 0.5. In this case, the quantity of audio data d1', d2', d3', . . . stored in middle queue Qy after performing the WSOLA processing should be increased by two times. For this, the average value of every two adjacent audio data is taken to form a new audio data which is in turn inserted between the two adjacent audio data. Thus, the amplitude values of audio data d1", d2", d3", d4", d5" . . . obtained from the up-sampling like this have the following relation:

$$d1"=d1'$$

$$d2"=(d1'+d2')/2$$

$$d3"=d2"$$

$$d4"=(d2'+d3')/2$$

$$d5"=d3'$$

According to the above-described down-sampling or up-sampling, the quantity of every audio data frame stored in middle queue Qy is increased or decreased in accordance with the fastness or slowness of the designated playback speed, and the amplitude values of up/down-sampled audio data are determined by taking the amplitude values of the audio data stored in middle queue Qy or by interpolating them based on the rule as above, prior to being transferred to output queue Qz. It should be noted that in the above description, values of respective playback speed control rates α are exemplary, and the above rule of the down-sampling or up-sampling is also generally available when any other different playback speed is designated.

The audio data newly obtained by the down-sampling or the up-sampling is transferred to output queue Qz in the frame unit. And the audio data of the output queue Qz is sequentially written to buffer 24 by sets by the execution of the RTTSM-out function. By doing so, an existing audio packet of buffer 24 is replaced with a new corresponding audio packet from output queue Qz that has been subjected to the WSOLA processing and down/up-sampling. The audio data to be provided to audio output 20 is the new corresponding audio packet.

According to the reproducing apparatus proposed by the present invention, whenever a playback speed change is instructed, the presentation time interval of the audio data is newly calculated to be increased/decreased in response to a value of the designated playback speed and audio output 20 is operated in the manner that the audio data obtained by the sampling is reproduced by the newly-calculated presentation time interval. Therefore, even when a playback speed designated is different from the normal playback speed, the tone of the reproduced sound is substantially identical with that of being reproduced in the normal playback speed and the synchronization with the video data causes no problem.

The present invention introduces three data storage means which are input queue, middle queue and output queue for the TSM processing and up/down-sampling processing. But it should be appreciated that there is no need to separate them in the physical sense as one memory of the reproducing apparatus may be divided into three memory areas and so utilized. Furthermore, three queues are defined for the convenience of embodying the software but there is no need to define three queues separated as above. In other words, there may be other ways of defining the queues that form one unified full-size queue of which is divided into three and each of the three regions is defined to act as a circular queue by controlling a pointer thereof.

The method of processing the audio data according to the present invention as described above can be embodied in a software method to be directly applied to a computer which is installed with the Windows operating system and a program referred to as the Direct Media of Microsoft Co. Ltd. In realizing the software method, the program embodying the algorithm of the audio data processing method is stored in the hard disc (not shown) or a ROM 240 within the computer and is implemented by CPU 230 when a multimedia reproducing program is run. Buffer 24 or three circular queues Qx, Qy and Qz appropriately utilize the resources of a RAM (not shown) within the computer, and a sound card (not shown) within the computer is utilized as the audio output 20.

The possibility of applying the method of processing the audio data according to the present invention is not limited to a computer. The method can be also applied to DVD system 100a, digital VCR system or another similar systems, i.e., any digital reproducing apparatus for reproducing the compressed and encoded video data and audio data. Moreover, it may be applied to a tape recorder, VCR system 100b of analog system, or similar system. in other words, the method of processing the audio data according to the present invention can be widely applied regardless of the analog system or digital system without being related to the compressing method or encoding method of data once it is for a reproducing apparatus related to the processing of audio data. Just that, in terms of the reproducing apparatus of analog system, the audio signal is converted into a digital signal, the RTTSM filtering processing according to the present invention is performed, and it is converted to the analog signal again to be reproduced.

These reproducing apparatuses read out the audio signals from a recording medium in response to the value of the playback speed designated by the user.

Figure 13:
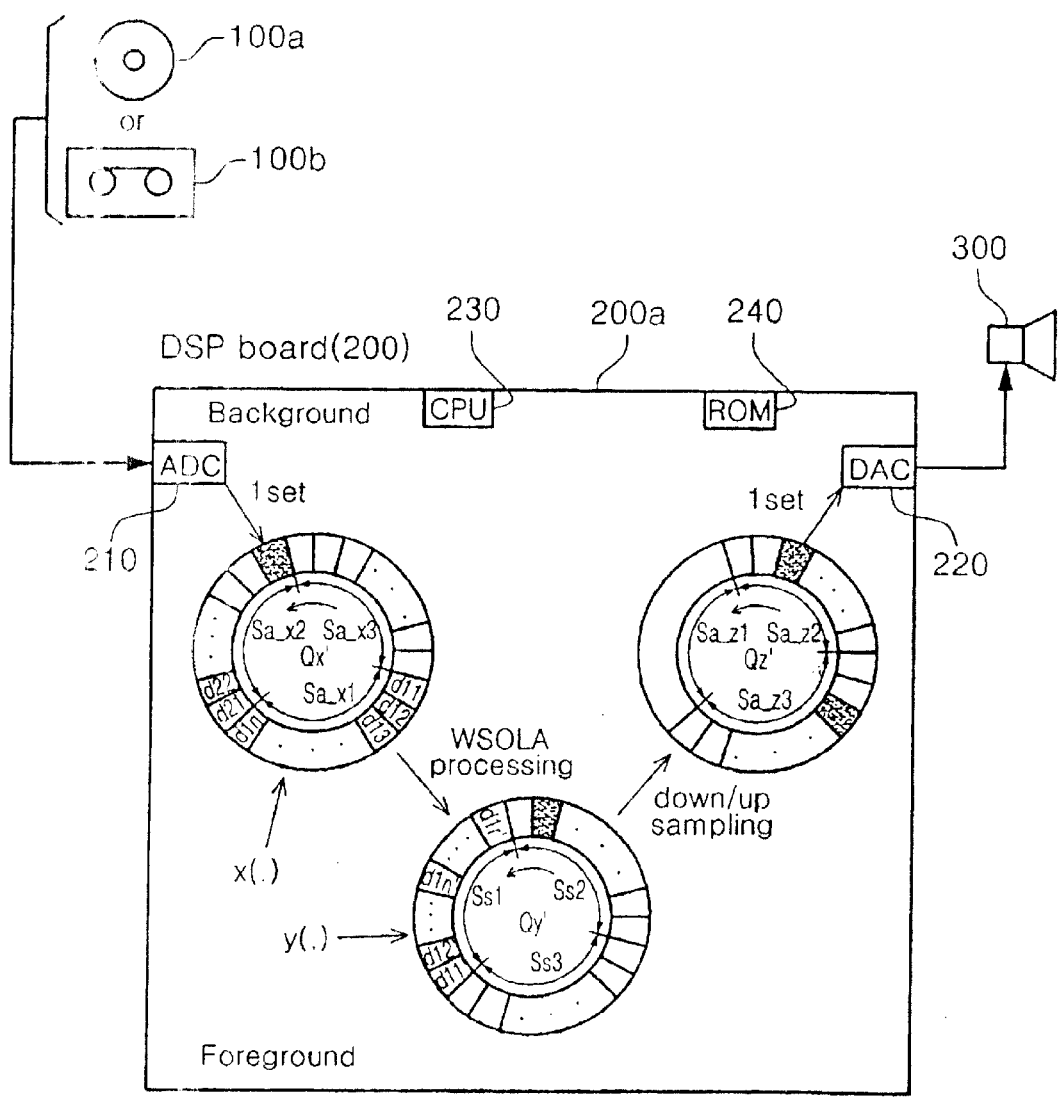
FIG. 13 shows the formation of a digital signal processing board for processing the audio data according to the present invention, which is added to an audio or audio/video reproducing apparatus such as a tape recorder, a VCR, a DVCR and a DVD system to be capable of maintaining the tone of the reproduced sound upon the slow or fast reproduction mode unchanged as of the normal playback speed.

FIG. 13 shows a constitution of a digital signal processing (DSP) board 200 for processing the audio data according to the present invention, which is employed by an audio/video reproducing apparatus such as a VCR system representable as the analog-based reproducing apparatus or a DVD system representable as the digital-based reproducing apparatus and is capable of maintaining the tone of the reproduced sound without being influenced by the change of the designated playback speed.

Naturally, the reproducing apparatus is provided for the purposes of the present invention with a playback speed control means for calculating the playback speed control ratio α between the user's designated playback speed and the normal playback speed and calculating the new presentation time interval after multiplying the audio data presentation time interval of the normal playback mode by playback speed control ratio α. A combination of a key input (not shown) and a controller such as a microcomputer and a CPU 230 can function as the playback speed control means.

DSP board 200 may consist of a ROM 240, a RAM (not shown) in which three queues can be formed by defining the RAM resource, CPU 230 or DSP chip, an oscillator (not shown), an analog/digital converter (ADC) 210, a digital/analog converter (DAC) 220, and so on. A program realizing the RTTSM-calc function is resident in ROM 240, and the RAM is operated to be utilized as input queue Qx', middle queue Qy' and output queue Qz'. ADC 210 is supplied With audio signals recorded on the video tape from a servo 100 to convert it into digital data. DAC 220 converts the digital data into analog signals to permit it to be reproduced as sound via speaker 300. CPU 230 sequentially implements the loaded program stored in ROM 240 to perform several data processing tasks for writing the output data of ADC 210 on input queue Qx', transferring audio data accumulated in output queue Qz' to DAC 220 and performing the WSOLA processing and the down/up-sampling with respect to audio data by implementing the above-stated RTTSM-calc function with respect to the data accumulated on input queue Qx'. When the source signal recorded on the recording medium is recorded as the analog signal, as in the analog VCR, ADC 210 is necessary. But, ADC 210 is not required when the source data is of the digital signal as in the DVD system.

DSP board 200 is formed with a background 200a and a foreground 200b. Background 200a performs the functions of processing the audio data on the hardware basis, writing the output data of ADC 210 on input queue Qx' and transmitting the audio data accumulated on output queue Qz' to DAC 220. The foreground 200b performs the function of transferring the data obtained by performing the WSOLA processing and the down/up-sampling in turn with respect to the audio data stored in input queue Qx' by implementing the RTTSM-calc function in accordance with the program to the output queue Qz'. That is, background 200a plays the roles of foregoing RTTSM-put function and RTTSM-out function on the hardware basis. In other words, background 200a simultaneously performs a writing operation of the audio data of an audio signal supplying means 100a or 100b to input queue Qx' in the set unit and a reading operation of the audio data stored in output queue Qz' in the set unit, and converts the audio data read out from output queue Qz' as the analog signal. Foreground 200b serves for performing the TSM processing by using a predetermined TSM algorithm like WSOLA with respect to the audio data stored in input queue Qx' in the frame unit to increase/decrease the data quantity in response to the fastness or slowness of the designated playback speed, and performing the down-sampling or up-sampling with respect to the audio data obtained via the TSM processing in accordance with the designated playback speed to restore the quantity of the audio data after being subjected to the sampling to the level substantially identical with that of the original audio data to transmit it to output queue Qz'.

Figure 14A:
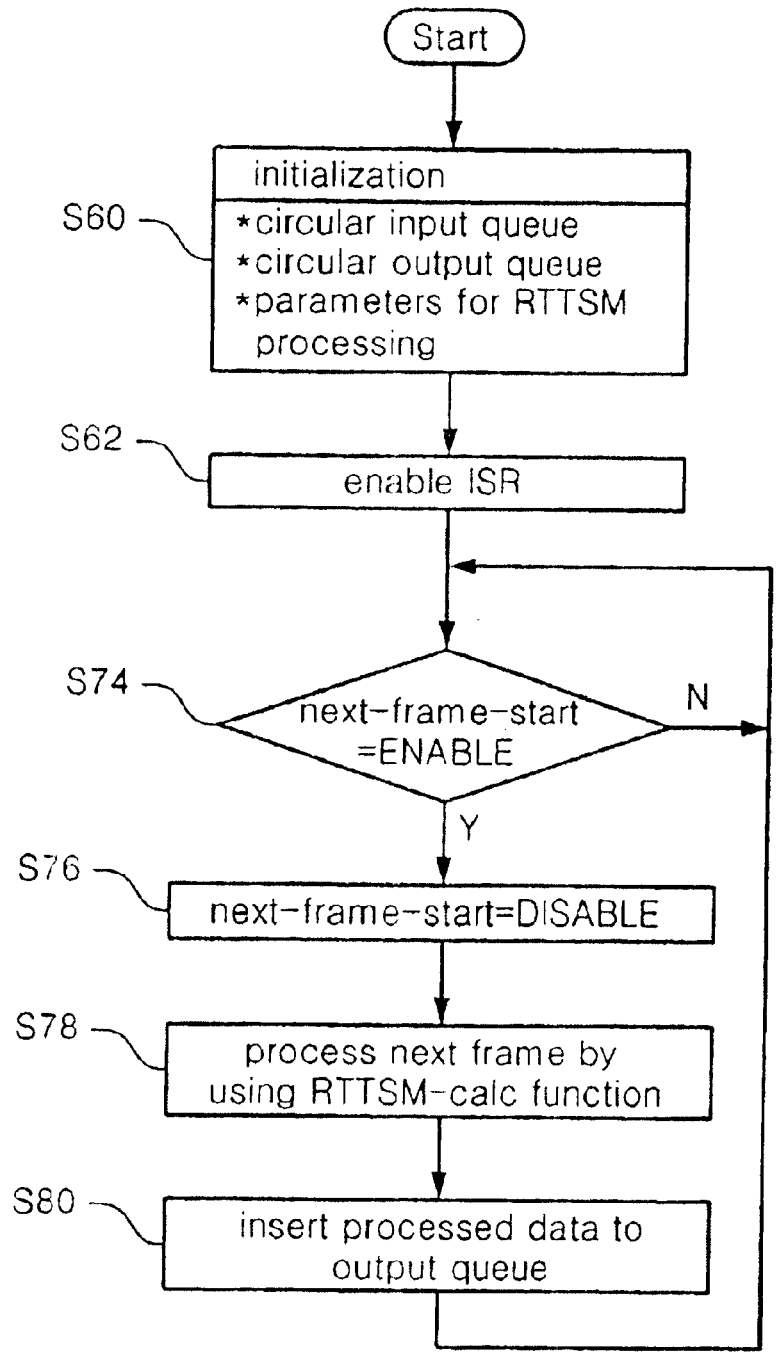
FIG. 14(a) is a flowchart for illustrating the data processing procedure of the foreground portion.
Figure 14B:
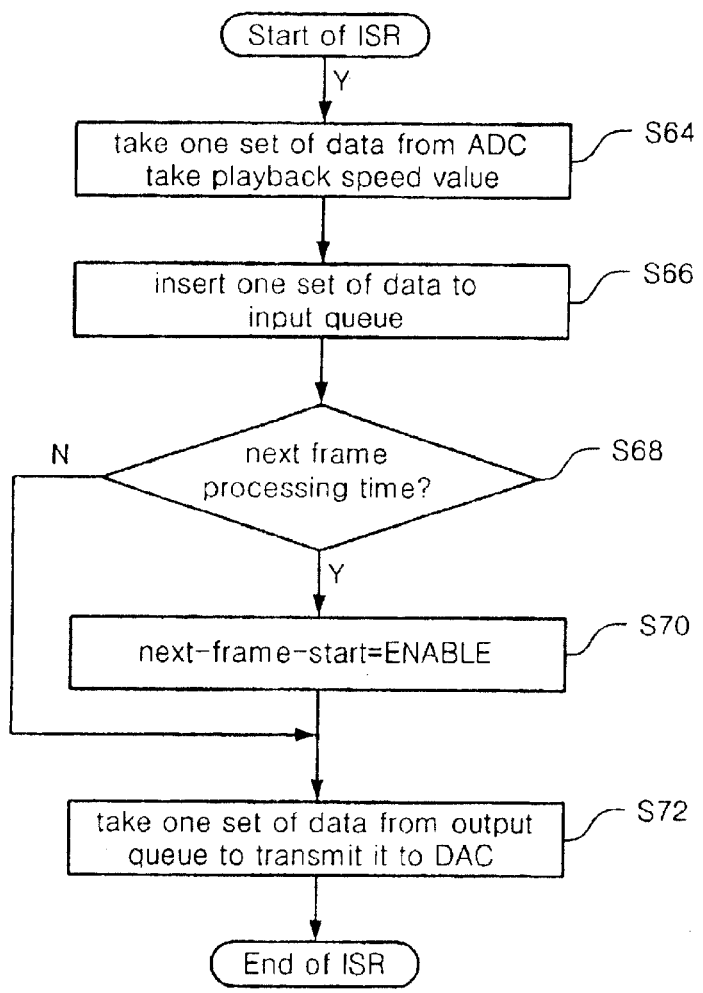
FIG. 14(b) is a flowchart for illustrating that of the background portion.
Figure 14C:
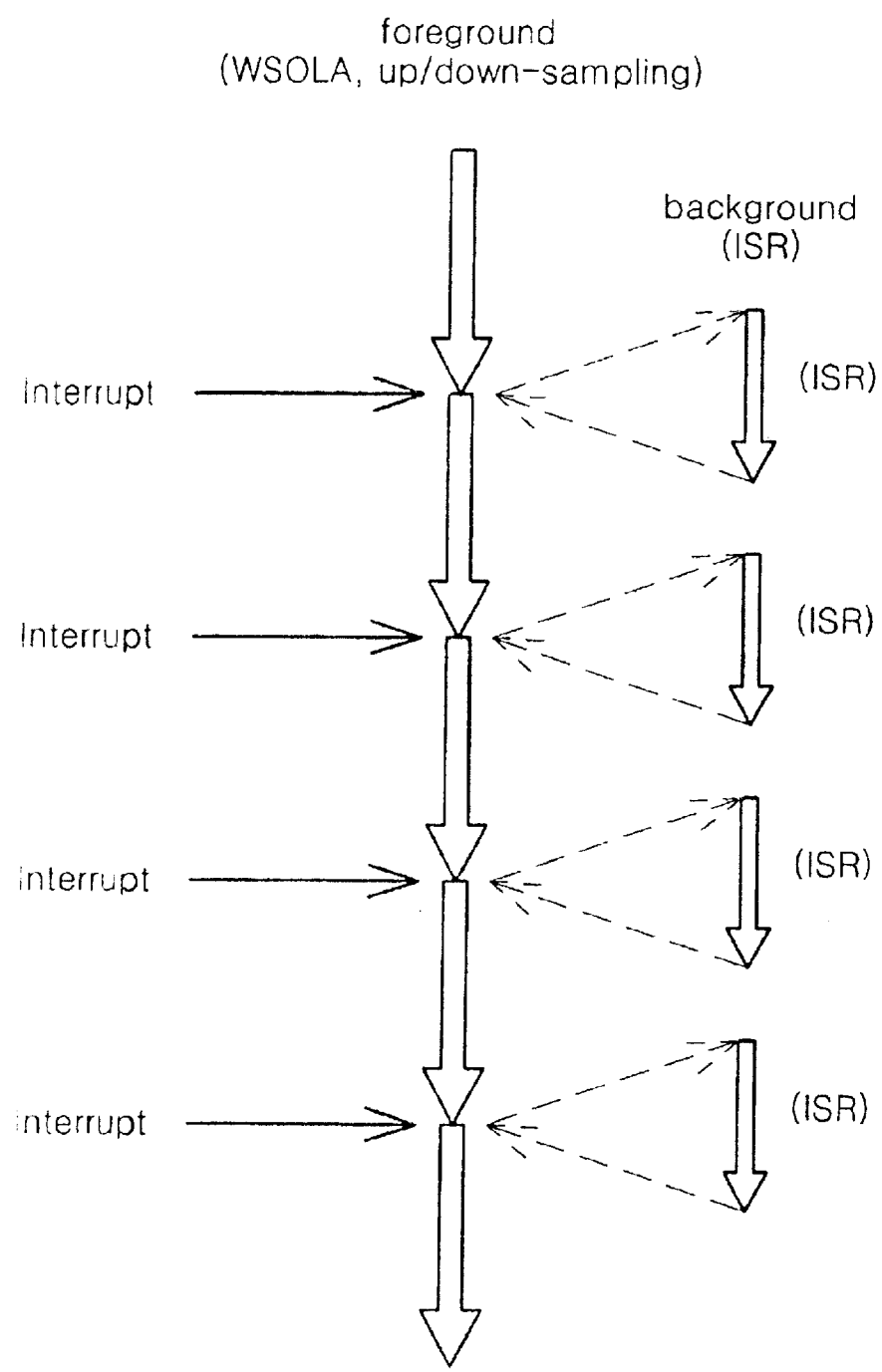
FIG. 14(c) is a view for illustrating the relation of executing the switching of the foreground portion and background portion.
Figure 15:
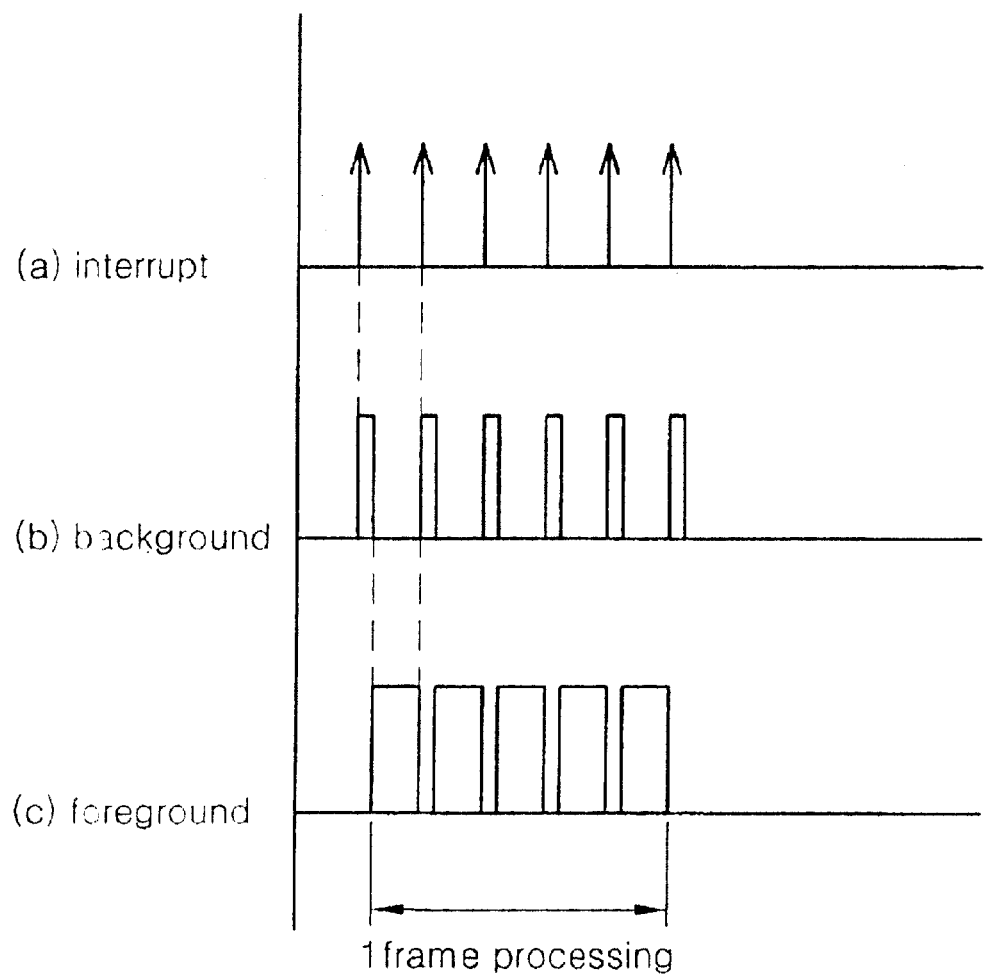
FIG. 15 is timing charts with respect to the operating time of the background portion and foreground portion, using the interrupt signal as a reference.

FIG. 14(a) is a flowchart for illustrating the data processing procedure of foreground 200b, FIG. 14(b) is a flowchart for illustrating that of background 200a, and FIG. 14(c) is a view for illustrating the relation of switching foreground 200b and background 200a. FIG. 15 are timing charts with respect to the operating times of background 200a and foreground 200b, using the interrupt signal as a reference.

While foreground 200b is for executing the operations such as the TSM processing and up/down-sampling processing, background 200a controls the input/output of the audio data for carrying out such processing. Consequently, the former requires the processing time longer than that of the latter. Accordingly, it is preferable that the CPU resource is operated in a manner that CPU 230 provides the resource thereof for affording the service to execute background 200a whenever the interrupt signal is supplied while performing the RTTSM-calc function by foreground 200b, and continues the processing of foreground 200b by returning to the foreground processing routine just before executing the interrupt service routine (ISR) once the aforementioned ISR is finished.

Referring to FIGS. 14(a) and 14(b), the procedure of executing foreground 200b and background 200a will be described in more detail. Upon initiating the reproducing operation, CPU 230 of DSP board 200 sequentially reads out the program stored in ROM 240 to implement the data processing for reproducing the audio data. First, input queue Qx', output queue Qz' and various environmental parameters for performing the WSOLA processing are initialized (step S60).

When the interrupt signal is generated periodically by counting the clock signal provided by an oscillator of the reproducing apparatus, a value of the ISR having the default value as Disable is shifted into Enable, and data processing (steps 564 to 572) by background 200a is carried out whenever the ISR is Enabled. Because foreground 200b performs the filtering processing upon the audio data obtained by carrying out the ISR of background 200a, an infinite loop is implemented until a next-frame-start flag is shifted into Enable (step S74).

In order to perform the ISR processing, CPU 230 brings out the audio data of one set from ADC 210 (step S64), and separately brings out a playback speed designated by a user from the user interface such as the key input (not shown). The audio data from ADC 210 is written on input queue Qx' (step S66). A value is cumulatively counted as writing it on input queue Qx' by one set at a time, and it is checked whether the counted value reaches the total set number included in a single frame. If it is true, a value of the next-frame-start flag, which is initially set to Disable, is shifted into Enable (steps 568 and S70). The processing hereinbefore is equivalent to that of the above-stated RTTSM-put function. The difference is that the output data of ADC 210 is written on input queue Qx'. Subsequently, CPU 230 accesses the output queue Qz' to read out one set of the audio data stored therein to transfer it to DAC 220 (step 572). This is equivalent to the RTTSM-out function. The ISR processing as described above is performed only when a background pulse maintains a high state as shown in FIG. 15(b).

The foreground processing is designed to implement an infinite loop once it is initiated. In more detail, if the value of next-frame-start flag is set to Enable, the value of next-frame-start flag is shifted to Disable which is the basic set value (step S76). Thereafter, the RTTSM-calc function is executed upon the audio data stored in input queue Qx' in accordance with the foregoing method to perform the WSOLA processing and down/up-sampling (step S78). Then, the processed data is transferred to output queue Qz' and stays therein until it is outputted to DAC 220.

When the user designates the playback speed to the fast or slow mode rather than the normal mode, conventional VCR systems read out the data from the tape at a designated playback speed, which is the same as the conventional reproducing apparatus for reading out to reproduce the data from a recording medium such as the tape recorder, DVCR and DVD. Consequently, the analog audio signal supplied into ADC 210 is the data already compressed or extended in time scale to have the varied tone, and the output signal of ADC 210 is only changed into the digital data while maintaining the changed tone state intact. Hence, the output data of ADC 210 is considered as being equivalent to the data stored in buffer 24 before performing the RTTSM filtering processing according to the present invention. Thus, once this data is received to implement the RTTSM-calc function, the resultant audio signal maintains the tone to be substantially identical with that during the normal playback and causes no inconsistency in the synchronization with the video signal with the consequence of achieving the objects of the present invention.

On the other hand, when being applied to the digital VCR system, overall data processing system is almost the same as the foregoing vase except for the slight difference that ADC 210 is not needed in DSP board 200 since the original signal is digital. Similarly, DSP board 200 may be formed without employing ADC 210 due to the fact that this original signal is the digital signal regardless of a difference that the recording medium of the DVD system is the DVD without being the tape, and the overall data processing is almost the same as in the foregoing case.

According to one aspect of the present invention as described hereinbefore, the audio data is reproduced by applying the method of extending/compressing the value of the presentation time interval of respective audio data in accordance with a value of the designated playback speed. According to the above method, since the audio data should be reproduced and output by corresponding to the designated presentation time interval, the process of down-sampling or up-sampling upon the audio data is required.

However, according to another aspect of the present invention, audio output 20 is controlled to extend/compress a whole presentation time of the audio data in accordance with the fastness or slowness of the designated playback speed while maintaining the presentation time interval of respective audio data as the value of the normal playback speed. According to this aspect, the down-sampling or the up-sampling is not required in case of the slow playback mode or the fast playback mode. More specifically, it is controlled so that the whole presentation time of the audio data set by the normal playback speed as a reference is extended/compressed in response to a value of the designated playback speed, and the presentation time interval of the audio data maintains the value of the normal playback speed. Meanwhile, the TSM processing is performed with respect to the audio data by applying the above-described TSM algorithm to increase/decrease the data quantity in accordance with a value of the playback speed designated by the user. Then, the audio data subjected to the TSM is controlled to be reproduced during the changed presentation time by the presentation time interval. Once the signal processing for reproducing the audio data is performed in the foregoing manner as described above, the reproduced sound also maintains the tone substantially identical with that of the normal playback speed without being influenced by the value of the designated playback speed. It is advantageous in that the sampling of the audio data can be deleted to allow the sound quality to be nearer to the original sound.

According to the present invention as described above, even when the playback speed designated by the user is fast or slow rather than the normal playback speed, the audio data can be processed to make the tone of the reproduced sound be substantially identical with that of the normal playback speed by being reproduced by the changed presentation time interval. Consequently, it may be widely applied to multimedia reproducing apparatus such as the analog VCR system, the digital VCR system, the computer system and the DVD system to simultaneously reproduce the audio data together with the video data at a desired playback speed, and the tone thereof also has good quality.

Furthermore, the method of processing the audio data according to the present invention may be performed independently of the processing of the video data. Therefore, it is widely applicable to above-mentioned, different media reproducing apparatuses. In other words, a module embodied with the method of processing the filtering of the audio data according to the present invention is simply added to an audio signal processing module of respective media reproducing apparatuses, thereby being capable of forming the media reproducing apparatus to have the audio data reproducing function according to the present invention.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A method of reproducing original audio data having a given sampling quantity and a given tone, in response to a value of a playback speed designated by a user, comprising the steps of;

performing a time scale modulation processing with respect to the original audio data in accordance with a time scale modulation algorithm to increase or decrease the quantity of the original audio data in response to the value of the playback speed; and down-sampling or up-sampling with respect to audio data obtained by the time scale modulation processing in accordance with the value of the designated playback speed to restore the quantity of sampled audio data to a level of the given sampling quantity of the original audio data in a manner such that a tone of the sampled data is substantially identical to the given tone of the original audio data while the sampled data is reproduced at the playback speed designated by the user.

2. A method of reproducing audio data as claimed in claim 1, further comprising newly calculating a presentation time interval of the audio data to be increased/decreased in accordance with the value of the designated playback speed in response to a change of the playback speed.

3. A method of reproducing audio data as claimed in claim 2, further comprising reproducing the sampled audio data by a newly-calculated presentation time interval.

4. A method of reproducing audio data as claimed in claim 1, wherein the step of time scale modulation comprises the steps of:

writing the original audio data stored in a buffer on an input queue in a set unit per predetermined time interval; and performing the time scale modulation algorithm in a frame unit upon the audio data stored in the input queue to decrease the quantity of the audio data in accordance with the designated playback speed when the designated playback speed is faster than the normal playback speed, or to increase the quantity of the audio data in accordance with the designated playback speed when the designated playback speed is slower than the normal playback speed, and providing time scaled audio data to a middle queue.

5. A method of reproducing audio data as claimed in claim 4, wherein the sampling step comprises the steps of:

with respect to the time scaled audio data stored in the middle queue, performing the up-sampling processing when the designated playback speed is faster than the normal playback speed, performing the down-sampling when the playback speed is slower than the normal playback speed, so that the quantity of the sampled audio data to be transferred to an output queue is substantially identical to the given sampling quantity of the original audio data; and transferring the sampled audio data stored in the output queue to the buffer in the set unit per predetermined time interval.

6. A method of reproducing audio data as claimed in claim 5, wherein each of the input queue, middle queue and output queue is operated as a circular queue by controlling a queue pointer thereof.

7. A method of reproducing audio data as claimed in claim 5, wherein the sampled audio data of the output queue is overwritten to the buffer so as to replace the original audio data existing in the buffer.

8. A method of reproducing audio data as claimed in claim 4, wherein the predetermined time interval is a newly calculated presentation time interval of the sampled audio data which is varied in accordance with the value of the designated playback speed.

9. A method of reproducing audio data as claimed in claim 4, wherein the number of sets of the original audio signal which is written to the input queue is cumulatively counted, and a calc-nextframe flag having a Disable default state is shifted to an Enable state when the counted number of sets becomes equal to the number of sets of one frame, thereby performing the time scale modulation algorithm in the frame unit.

10. A method of reproducing audio data as claimed in claim 4, wherein the set unit is comprised of one audio data in case of a mono system or of two audio data for left/right channels in case of a stereo system.

11. A method of reproducing audio data as claimed in claim 1, wherein in the up/down sampling, a varying ratio of data quantity is calculated in accordance with the value of the designated playback speed, and the quantity of the audio data obtained by the time scale modulation processing is varied in accordance with the varying ratio while characteristics of the audio data before and after the up/down-sampling are substantially identically maintained by using data interpolation.

12. A method of reproducing audio data as claimed in claim 1, wherein the time scale modulation algorithm increases or decreases the quantity of the original audio data in accordance with the value of the designated playback speed while maintaining the characteristics of the original audio data.

13. A method of reproducing decoded audio data in response to a playback speed designated by a user, before supplying the decoded audio data, which has been stored in a storage and been decoded in the MPEG system, to an audio output, comprising the steps of:

calculating a playback speed control ratio between the designated playback speed and a normal playback speed, and multiplying a presentation time interval of the decoded audio data in case of the normal playback speed by the playback speed control ratio to produce a new presentation time interval of the audio data;

writing the decoded audio data stored in the storage on an input queue in set units;

performing a time scale modulation algorithm in a frame unit with respect to audio data written on the input queue to increase or decrease a quantity of the decoded audio data in proportion to the playback speed control ratio, where audio data after the time scale modulation processing is written on a middle queue;

with respect to the audio data written in the middle queue, performing an up-sampling in case of a fast playback mode where the playback speed control ratio is smaller than 1 or a down-sampling in case of a slow playback mode where the playback control ratio is larger than 1, in a manner such that a sampling rate is applied as a reverse number of the playback speed control ratio for allowing the quantity of the audio data after performing the sampling to be substantially identical to the decoded audio data and sampled audio data is transferred to an output queue;

writing the audio data stored in the output queue to the storage in the set unit to replace existing decoded audio data; and reproducing the audio data newly written to the storage by the produced presentation time interval, such that a tone of a reproduced sound is substantially identical with that of the normal playback speed even when the designated playback speed is faster or slower than the normal playback speed.

14. A method of reproducing audio data as claimed in claim 12, wherein each of the input queue, middle queue and output queue is operated as a circular queue by controlling a queue pointer thereof.

15. A method of reproducing audio data as claimed in claim 12, wherein the set unit is comprised of one audio data in case of a mono system or of two audio data for left/right channels in case of a stereo system.

16. A method of reproducing audio data as claimed in claim 12, wherein in the up/down sampling, the amplitudes of the respective audio data are determined by implementing an interpolation method with respect to amplitudes of the audio data stored in the middle queue in accordance with the value of the playback speed control ratio to substantially identically maintain audio characteristics before and after the sampling.

17. A method of reproducing audio data as claimed in claim 12, wherein the time scale modulation algorithm increases or decreases the quantity of the decoded audio data in accordance with a value of the designated playback speed while maintaining the characteristics of the decoded audio data.

18. A method of reproducing audio data after being subjected to a filtering processing in accordance with a value of a playback speed designated by a user, comprising the steps of:

increasing or decreasing a presentation time of the audio data having a normal playback speed in response to the value of the designated playback speed, and maintaining a presentation time interval of the audio data to have a value of the normal playback speed;

performing a time scale modulation processing by using a predetermined time scale modulation algorithm with respect to the audio data to increase or decrease a quantity of the audio data in accordance with the value of the designated playback speed; and reproducing the audio data obtained from the time scale modulation processing during the changed presentation time by the presentation time interval, such that a tone of a reproduced sound is substantially identical to that of the normal playback speed even when the designated playback speed is faster or slower than the normal playback speed.

19. A method of reproducing audio data as claimed in claim 18, wherein the predetermined time scale modulation algorithm increases or decreases the quantity of the decoded audio data in accordance with the value of the designated playback speed while maintaining audio characteristics of the decoded audio data.

20. An apparatus for reproducing audio data in response to a value of a playback speed designated by a user, comprising:

a playback speed control that producing a playback speed control ratio between the designated playback speed and a normal playback speed, and a new presentation time interval by multiplying a presentation time interval of the audio data at the normal playback speed by the playback speed control ratio;

a storage for storing the audio data in packet units;

a filtering that provides time scale modulation processing in accordance with a predetermined time scale modulation algorithm with respect to the audio data stored in the storage to increase or decrease a data quantity of the audio data in accordance with the value of the designated playback speed, the filter further provides a down-sampling or up-sampling with respect to audio data obtained from the time scale modulation processing in accordance with the value of the designated playback speed to restore the quantity of sampled audio data to a level substantially identical with that of the audio data prior to the time scale modulation processing, and the filter writes the sampled audio data to the storage to replace existing audio data; and an audio output which receiving the filtered audio data from the storage by a new presentation time interval and reproducing the filtered audio data into a sound, such that a tone of a reproduced sound is substantially identical with that of the normal playback speed even when the designated playback speed is faster or slower than the normal playback speed regardless of being reproduced by the new presentation time interval.

21. An apparatus of reproducing audio signals as claimed in claim 20, wherein the predetermined time scale modulation algorithm increases or decreases the quantity of the audio data in accordance with the value of the designated playback speed while maintaining audio characteristics of the audio data.

22. An apparatus of reproducing audio signals as claimed in claim 20, wherein in the up/down sampling, the filtering calculates a varying ratio of data quantity in accordance with the value of the designated playback speed, and varies the quantity of the audio data obtained by the time scale modulation processing in accordance with the varying ratio while substantially identically maintaining audio characteristics of the audio data before and after the up/down sampling by using data interpolation.

23. An apparatus of reproducing audio signals comprising:

an audio signal supplier that provides audio signals from a recording medium in response to a value of a playback speed designated by a user; and a digital signal processing having a background portion for simultaneously writing audio data of the audio signal supplier on an input queue in the set unit and reading out of the audio data stored in an output queue in a set unit referenced to a frame unit, and converting the audio data read out from the output queue into an analog signal, and a foreground portion for performing a predetermined time scale modulation by using a predetermined time scale modulation algorithm in the frame unit with respect to the audio data stored in the input queue to increase or decrease the data quantity in response to the value of the designated playback, performing a down-sampling or up-sampling with respect to the audio data obtained by the time scale modulation processing in accordance with the value of the designated playback speed to restore a quantity of the sampled audio data to a level substantially identical with that of the audio data prior to the time scale modulation, and transferring the sampled audio data to the output queue.

24. An apparatus of reproducing audio signals as claimed in claim 23, wherein the digital signal processing further comprises analog/digital converting for converting an analog audio signal into digital data between the audio signal supplier and the input queue when the audio signal supplied from the audio signal processing is an analog signal.

25. An apparatus of reproducing audio signals as claimed in claim 23, wherein the predetermined time scale modulation algorithm increases or decreases the quantity of the audio data in accordance with the value of the designated playback speed while maintaining audio characteristics of the audio data.

26. An apparatus of reproducing audio signals as claimed in claim 23, wherein in the up/down sampling, the digital signal processing calculates a varying ratio of data quantity in accordance with the value of the designated playback speed, and varies the quantity of the audio data obtained by the time scale modulation processing in accordance with the varying ratio while substantially identically maintaining audio characteristics of the audio data before and after the up/down-sampling by using data interpolation.

* * * * *